(12) United States Patent
Keys

(10) Patent No.: US 9,692,752 B2
(45) Date of Patent: Jun. 27, 2017

(54) ENSURING INFORMATION SECURITY USING ONE-TIME TOKENS

(71) Applicant: Bank of America Corporation, Charlotte, NC (US)

(72) Inventor: Andrew T. Keys, Albany, OR (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 14/542,935

(22) Filed: Nov. 17, 2014

(65) Prior Publication Data

US 2016/0140550 A1    May 19, 2016

(51) Int. Cl.
| | |
|---|---|
| *H04L 29/06* | (2006.01) |
| *H04L 9/32* | (2006.01) |
| *G06Q 20/40* | (2012.01) |
| *H04W 12/06* | (2009.01) |
| *G06Q 20/38* | (2012.01) |
| *G06Q 20/32* | (2012.01) |

(52) U.S. Cl.
CPC ....... *H04L 63/0838* (2013.01); *G06Q 20/385* (2013.01); *H04L 63/18* (2013.01); *H04W 12/06* (2013.01); *H04L 63/0861* (2013.01)

(58) Field of Classification Search
CPC .. G06Q 20/3223; G06Q 20/40; G06Q 20/322; G06Q 20/382; H04L 63/0853; H04L 63/0838; H04L 63/18; H04L 9/3271; H04L 2463/082; H04L 9/3228
See application file for complete search history.

(56) References Cited

U.S. PATENT DOCUMENTS 8,510,816 B2 * 8/2013 Quach ................... H04L 9/3215
726/7
2002/0169988 A1 * 11/2002 Vandergeest .......... H04L 63/126
726/4

(Continued)

OTHER PUBLICATIONS

Marforio, Claudio, et al. "Smartphones as practical and secure location verification tokens for payments." Proceedings of the Network and Distributed System Security Symposium, NDSS. 2014.*

(Continued)

*Primary Examiner* — Michael Simitoski
(74) *Attorney, Agent, or Firm* — Banner & Witcoff, Ltd.; Michael A. Springs

(57) ABSTRACT

Methods, systems, and computer-readable media for ensuring information security using one-time tokens are presented. In one or more embodiments, a computing platform may receive, from a user device, a request to access an online banking portal using a user account. Based on the request, the computing platform may generate and send a notification to a registered mobile device linked to the user account. After sending the notification, the computing platform may generate a one-time token message that includes a prompt for authorizing the user device to access the online banking portal using the user account. The computing platform then may send the one-time token message to the mobile device and receive token response input from the mobile device. Based on the input, the computing platform may prevent the user device from accessing the online banking portal or, alternatively, may provide the user device with access to the online banking portal.

15 Claims, 17 Drawing Sheets

(56) References Cited

U.S. PATENT DOCUMENTS

| | | | | |
|---|---|---|---|---|
| 2008/0307515 | A1* | 12/2008 | Drokov | G06Q 20/32 726/7 |
| 2009/0067686 | A1* | 3/2009 | Boshra | G06F 21/32 382/124 |
| 2009/0259848 | A1* | 10/2009 | Williams | H04L 63/0838 713/168 |
| 2009/0287599 | A1* | 11/2009 | Lamar, III | G06Q 20/10 705/39 |
| 2010/0242097 | A1* | 9/2010 | Hotes | G06F 9/468 726/4 |
| 2011/0191173 | A1* | 8/2011 | Blackhurst | G06Q 30/0251 705/14.49 |
| 2011/0213711 | A1* | 9/2011 | Skinner | G06F 21/43 705/71 |
| 2011/0219230 | A1* | 9/2011 | Oberheide | H04L 9/32 713/168 |
| 2011/0276489 | A1* | 11/2011 | Larkin | G06Q 20/20 705/44 |
| 2012/0028609 | A1* | 2/2012 | Hruska | G06Q 20/3674 455/411 |
| 2012/0116973 | A1* | 5/2012 | Klein | G06Q 20/108 705/44 |
| 2012/0124656 | A1* | 5/2012 | Senac | H04L 9/3213 726/9 |
| 2012/0185398 | A1* | 7/2012 | Weis | G06Q 20/20 705/75 |
| 2012/0323717 | A1* | 12/2012 | Kirsch | G06Q 20/0855 705/26.1 |
| 2013/0018791 | A1* | 1/2013 | Mendicino | G06Q 20/4016 705/44 |
| 2013/0178190 | A1* | 7/2013 | Celi, Jr. | H04W 12/06 455/411 |
| 2013/0198516 | A1* | 8/2013 | Fenton | H04L 63/0869 713/168 |
| 2013/0262303 | A1* | 10/2013 | Metral | G07F 19/20 705/43 |
| 2013/0297513 | A1* | 11/2013 | Kirillin | G06Q 40/02 705/67 |
| 2013/0312073 | A1* | 11/2013 | Srivastav | H04L 9/3215 726/7 |
| 2013/0346922 | A1* | 12/2013 | Shiplacoff | G06F 3/04842 715/835 |
| 2014/0020073 | A1* | 1/2014 | Ronda | G06F 21/31 726/7 |
| 2014/0046830 | A1* | 2/2014 | Orozco | G06Q 20/4016 705/39 |
| 2014/0058854 | A1* | 2/2014 | Ranganath | G06Q 20/4016 705/16 |
| 2014/0068723 | A1* | 3/2014 | Grim | H04L 63/08 726/4 |
| 2014/0137220 | A1* | 5/2014 | Niemela | G06F 21/31 726/6 |
| 2014/0161241 | A1* | 6/2014 | Baranovsky | H04M 3/51 379/142.05 |
| 2014/0162595 | A1* | 6/2014 | Raleigh | H04L 67/22 455/405 |
| 2014/0208404 | A1* | 7/2014 | Brouwer | G06F 21/62 726/6 |
| 2014/0245396 | A1* | 8/2014 | Oberheide | H04L 63/08 726/4 |
| 2014/0278526 | A1* | 9/2014 | Thakkar | G06F 19/322 705/3 |
| 2014/0279514 | A1* | 9/2014 | Sharp | G06Q 20/40145 705/44 |
| 2014/0289528 | A1* | 9/2014 | Baghdasaryan | G06Q 20/42 713/171 |
| 2014/0289833 | A1* | 9/2014 | Briceno | H04L 63/08 726/7 |
| 2014/0317744 | A1 | 10/2014 | Turgeman et al. | |
| 2014/0325223 | A1 | 10/2014 | Turgeman et al. | |
| 2014/0325645 | A1 | 10/2014 | Turgeman et al. | |
| 2014/0325646 | A1 | 10/2014 | Turgeman et al. | |
| 2014/0325682 | A1 | 10/2014 | Turgeman et al. | |
| 2014/0331119 | A1 | 11/2014 | Dixon et al. | |
| 2014/0337175 | A1 | 11/2014 | Katzin et al. | |
| 2014/0337188 | A1 | 11/2014 | Bennett et al. | |
| 2014/0337221 | A1 | 11/2014 | Hoyos | |
| 2014/0337930 | A1 | 11/2014 | Hoyos et al. | |
| 2014/0344149 | A1 | 11/2014 | Campos | |
| 2014/0344927 | A1 | 11/2014 | Turgeman et al. | |
| 2014/0351126 | A1* | 11/2014 | Priebatsch | G06Q 20/40 705/44 |
| 2014/0351909 | A1 | 11/2014 | Dallas et al. | |
| 2014/0358707 | A1 | 12/2014 | Perkins et al. | |
| 2014/0358777 | A1 | 12/2014 | Gueh | |
| 2014/0365350 | A1 | 12/2014 | Shvarts | |
| 2014/0365363 | A1 | 12/2014 | Knudsen et al. | |
| 2014/0367474 | A1 | 12/2014 | Radu et al. | |
| 2014/0372319 | A1 | 12/2014 | Wolovitz | |
| 2014/0373093 | A1 | 12/2014 | Wood et al. | |
| 2014/0380011 | A1 | 12/2014 | Johnson et al. | |
| 2014/0380452 | A1 | 12/2014 | Suwald | |
| 2015/0007049 | A1* | 1/2015 | Langlois | H04L 51/24 715/752 |
| 2015/0012426 | A1 | 1/2015 | Purves et al. | |
| 2015/0012441 | A1 | 1/2015 | Atsmon et al. | |
| 2015/0012444 | A1 | 1/2015 | Brown et al. | |
| 2015/0012757 | A1 | 1/2015 | Binder | |
| 2015/0019209 | A1 | 1/2015 | Boyle et al. | |
| 2015/0019441 | A1 | 1/2015 | Brown et al. | |
| 2015/0019944 | A1 | 1/2015 | Kalgi | |
| 2015/0025874 | A1* | 1/2015 | Matute | H04L 63/0853 704/4 |
| 2015/0026049 | A1 | 1/2015 | Theurer et al. | |
| 2015/0046989 | A1* | 2/2015 | Oberheide | G06F 21/44 726/6 |
| 2015/0046990 | A1* | 2/2015 | Oberheide | G06F 21/32 726/6 |
| 2015/0074408 | A1* | 3/2015 | Oberheide | H04L 9/083 713/171 |
| 2015/0261948 | A1* | 9/2015 | Marra | H04L 63/0853 726/4 |
| 2015/0310194 | A1* | 10/2015 | Zhang | G06F 21/31 726/9 |
| 2015/0312248 | A1* | 10/2015 | Pruthi | H04L 63/0838 726/7 |
| 2015/0334098 | A1* | 11/2015 | Keys | H04L 63/0853 726/9 |
| 2015/0334099 | A1* | 11/2015 | Zhang | H04L 63/08 726/6 |
| 2015/0339656 | A1* | 11/2015 | Wilson | G06Q 20/3226 705/44 |
| 2016/0019543 | A1* | 1/2016 | Taylor, III | H04L 63/08 705/44 |
| 2016/0112437 | A1* | 4/2016 | Churyumov | G06F 21/43 726/7 |

OTHER PUBLICATIONS

Zhu, Bo, Xinxin Fan, and Guang Gong. "Loxin—A Universal Solution to Password-Free Login.", 2013.*

Zhu, Bo, Xinxin Fan, and Guang Gong. "Loxin—A solution to password-less universal login." Computer Communications Workshops (Infocom Wkshps), 2014 IEEE Conference on. IEEE, 2014.*

Apple, Inc. "Local and Push Notification Programming Guide", Aug. 2011.*

Dierks, Tim, and Eric Rescorla. "Rfc 5246: The transport layer security (tls) protocol." The Internet Engineering Task Force (2008).*

Jaramillo, David, Richard Newhook, and Robert Smart. "Cross-platform, secure message delivery for mobile devices." Southeastcon, 2013 Proceedings of IEEE. IEEE, 2013.*

* cited by examiner

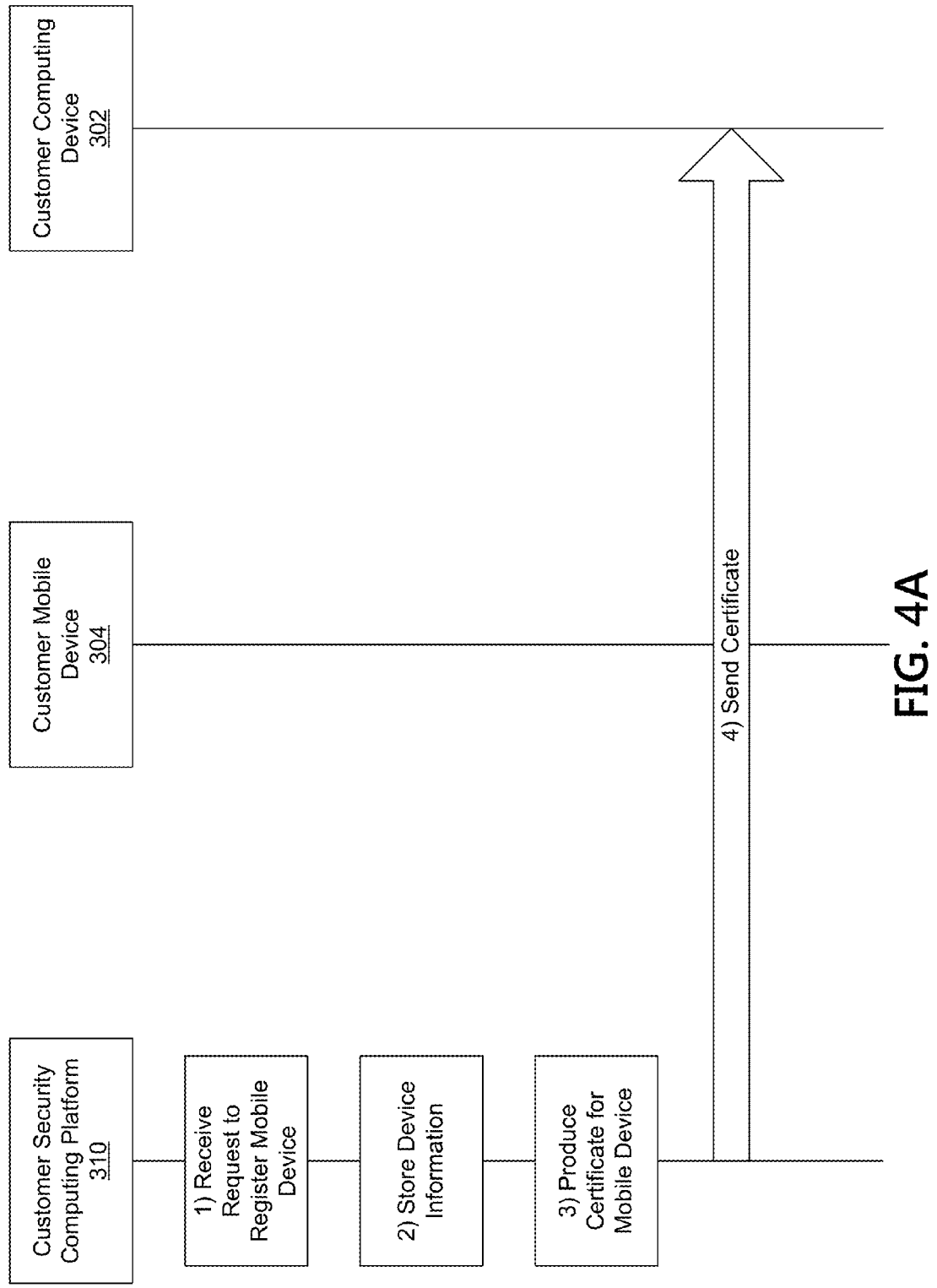

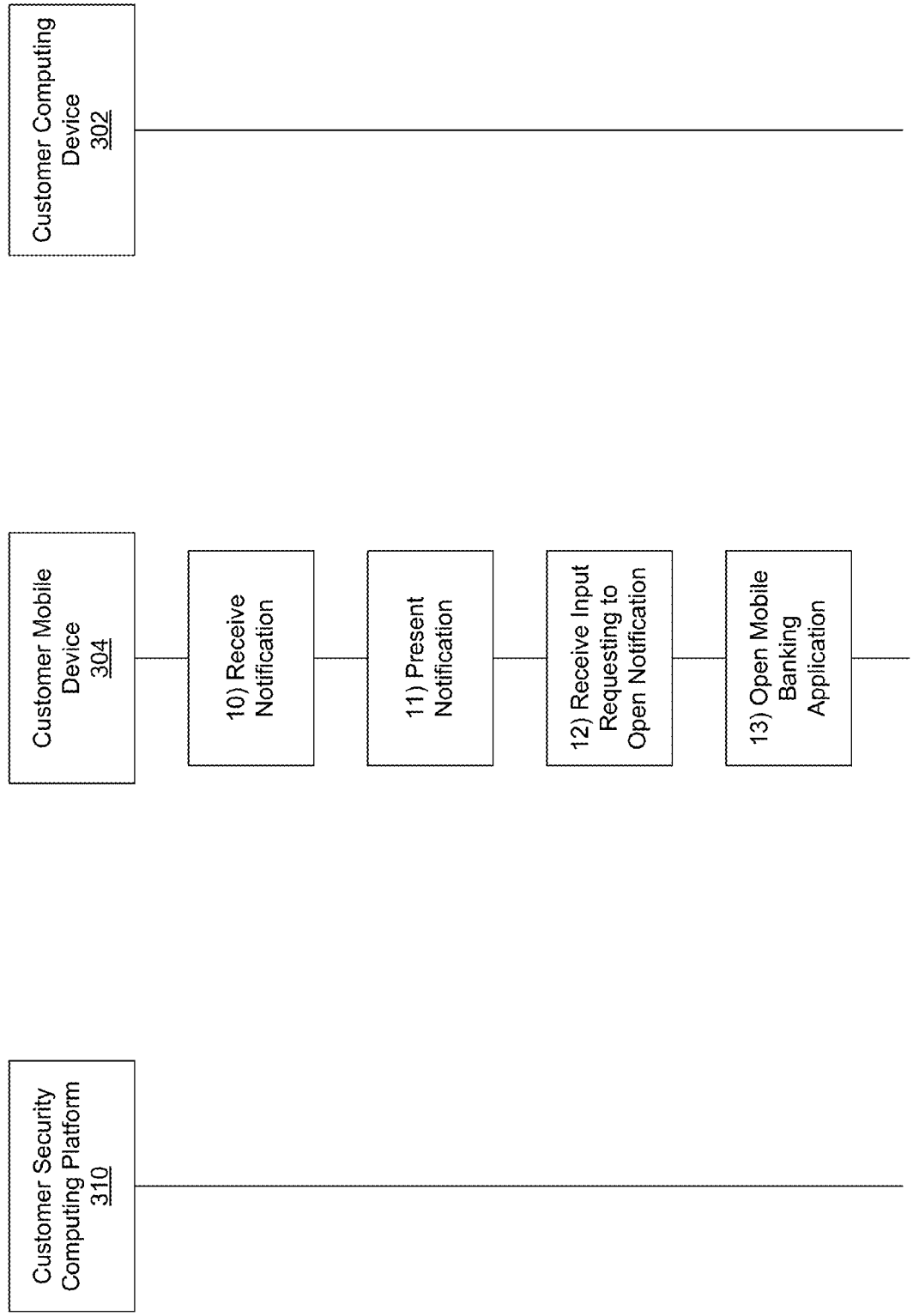

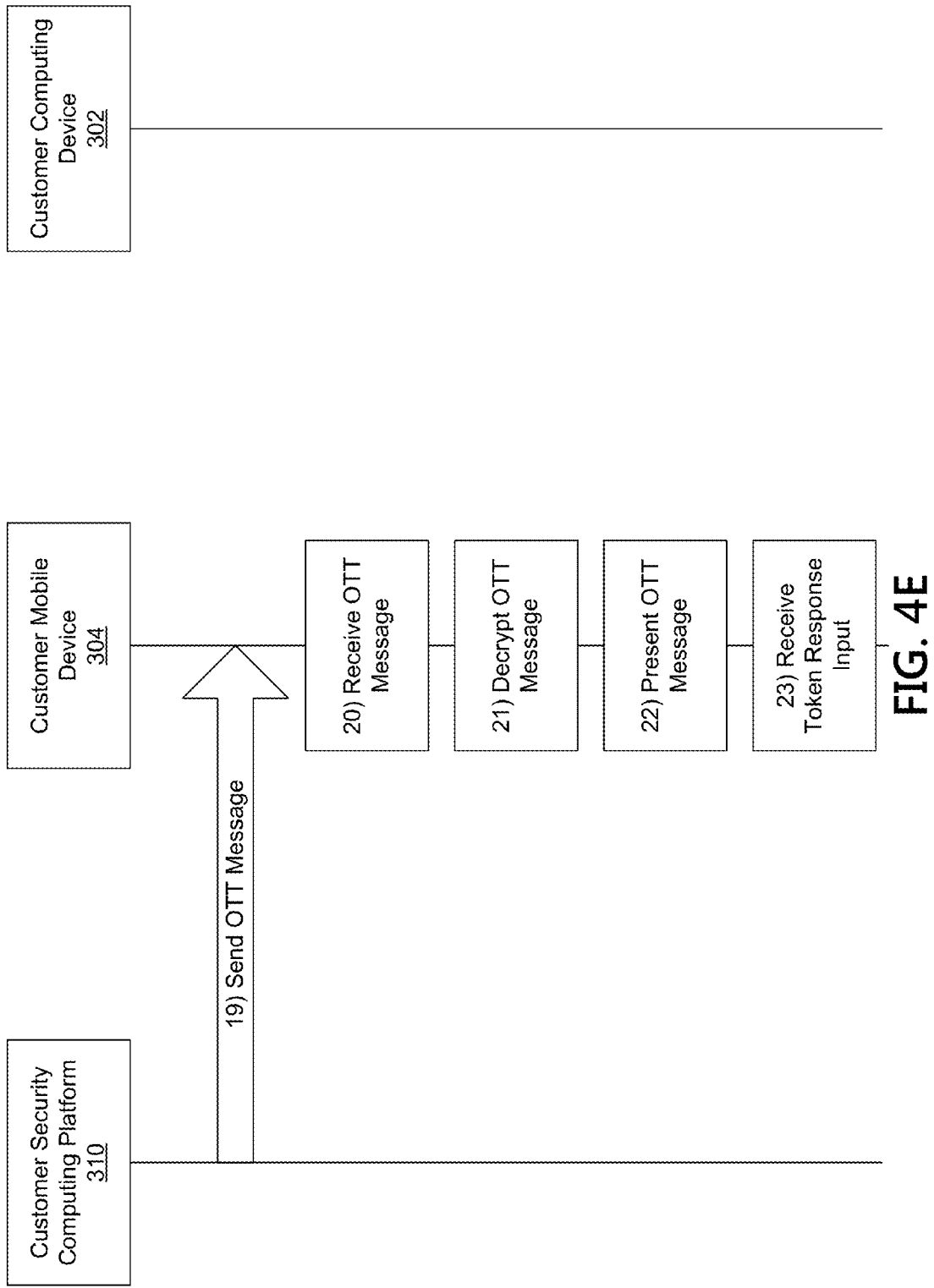

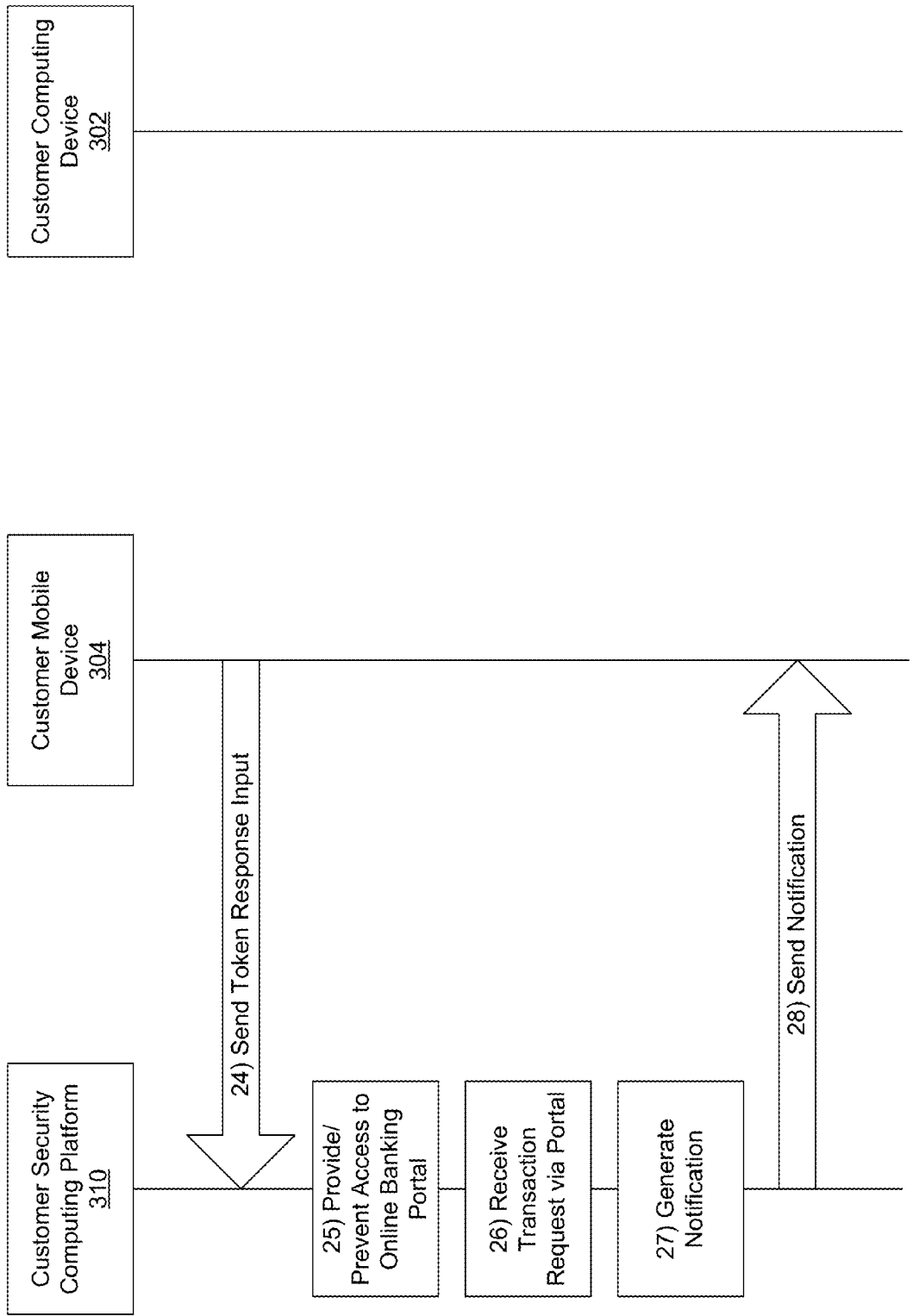

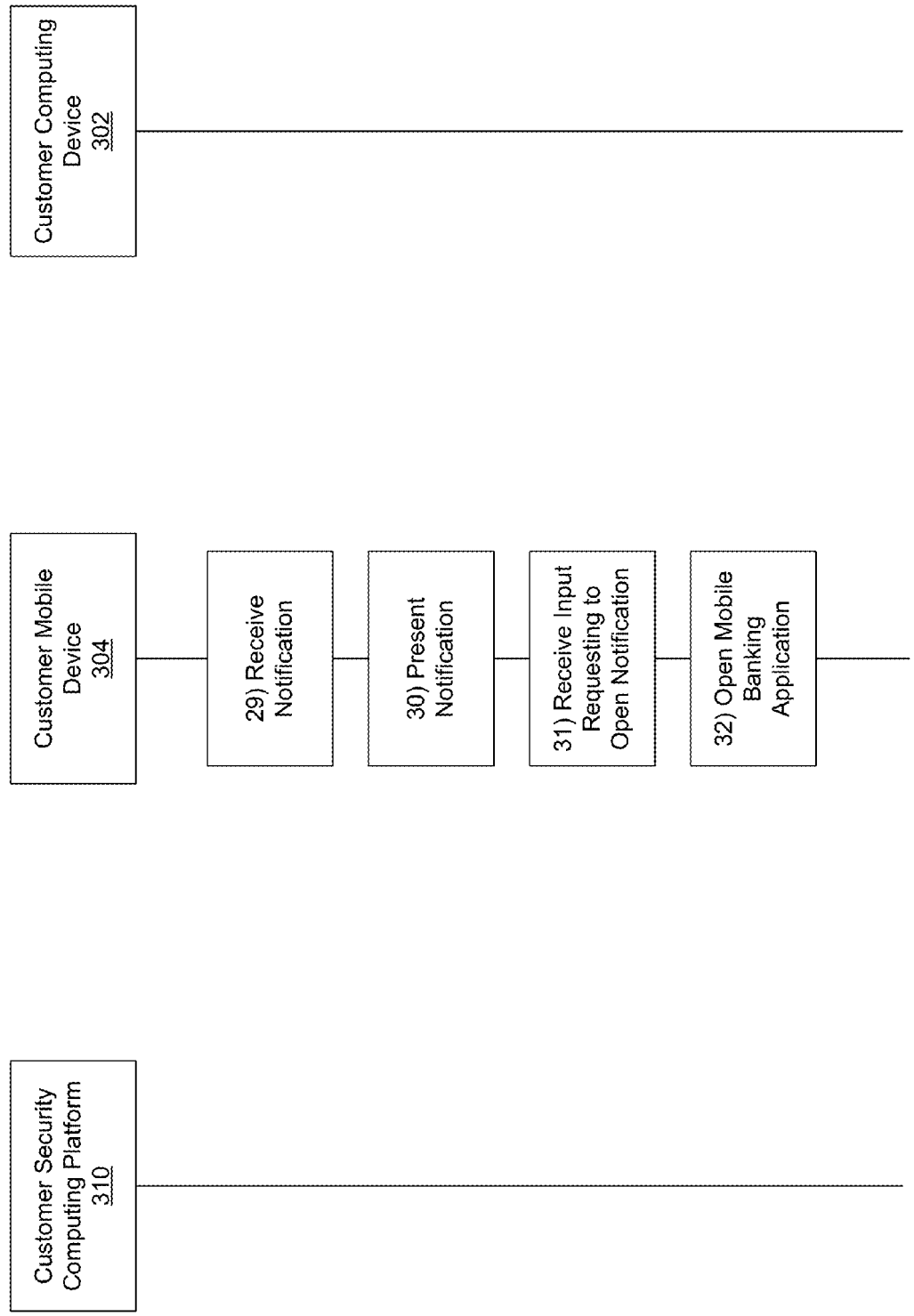

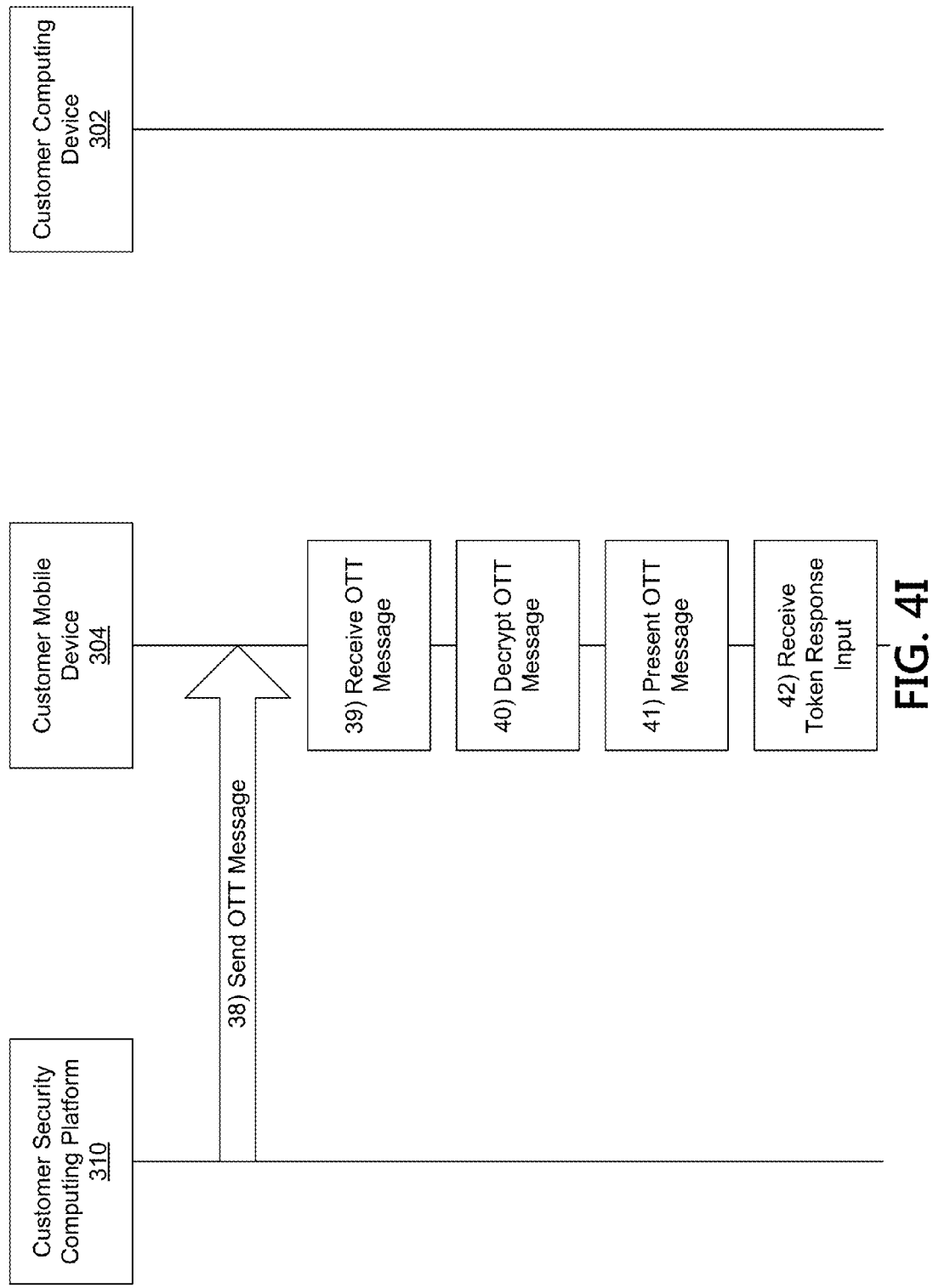

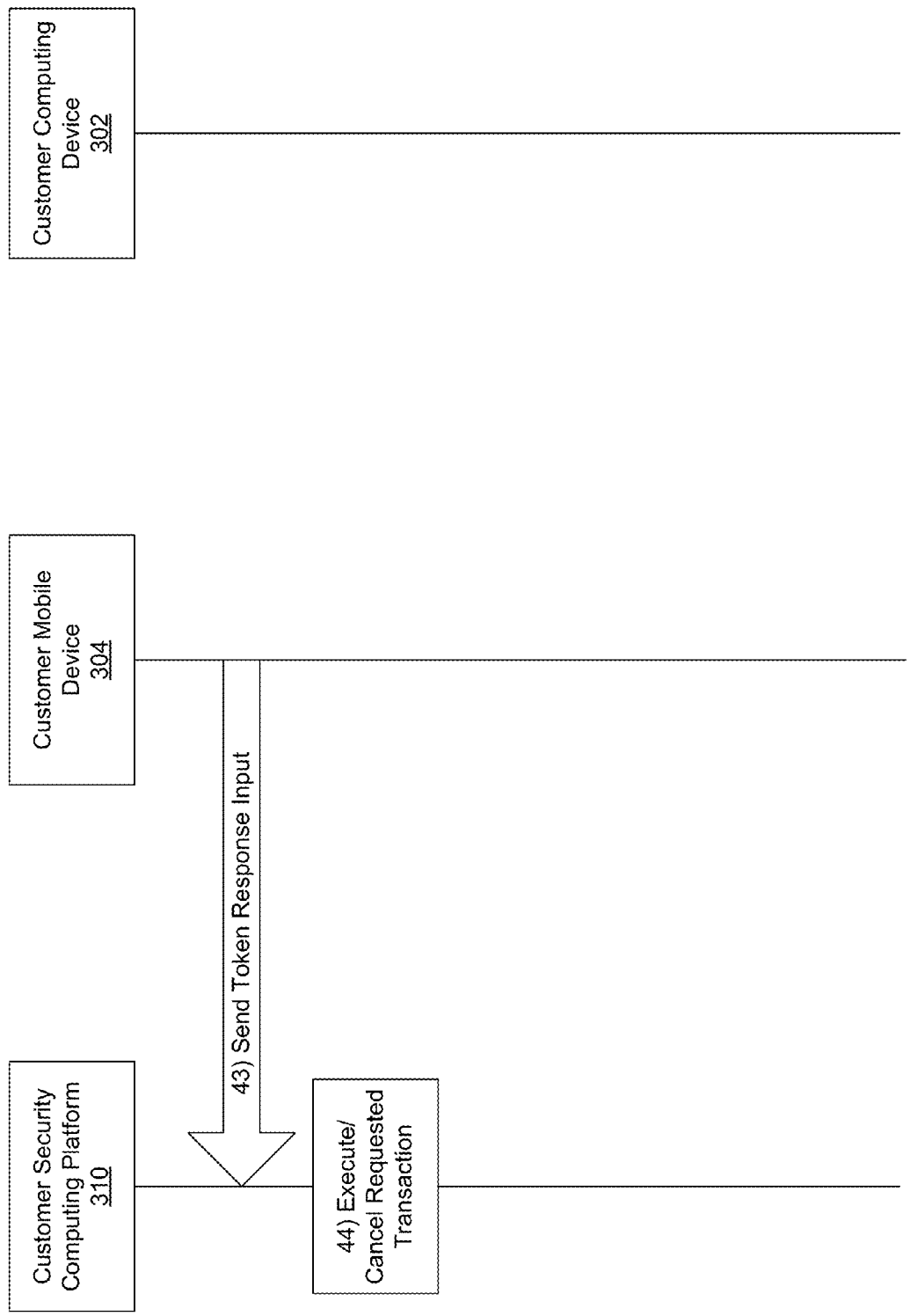

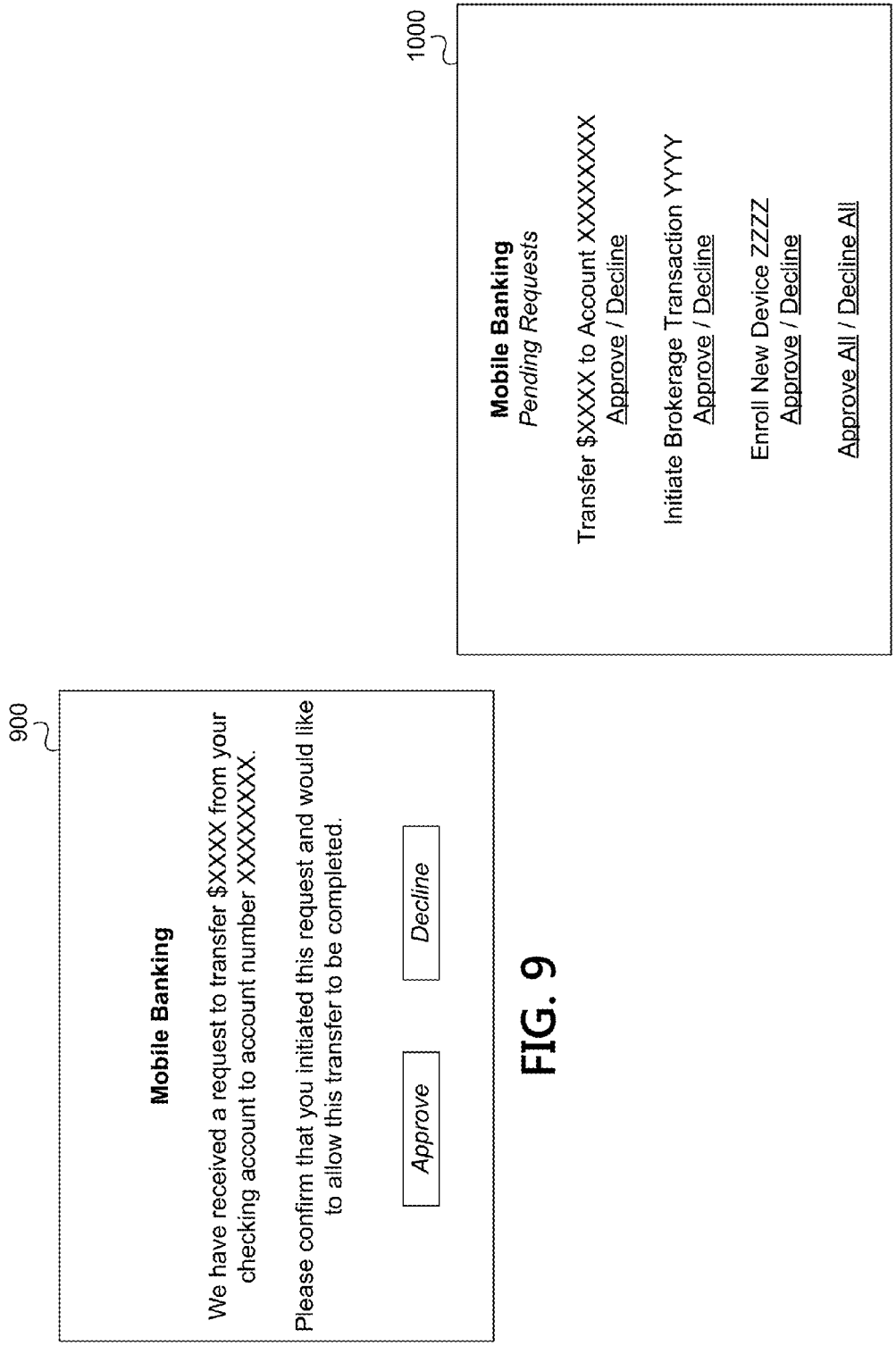

ENSURING INFORMATION SECURITY USING ONE-TIME TOKENS

BACKGROUND

Aspects of the disclosure relate to computer hardware and software. In particular, one or more aspects of the disclosure generally relate to computer hardware and software for ensuring information security using one-time tokens.

Large organizations, such as financial institutions, may serve many customers, and increasingly, customers of such organizations are using computing devices, including mobile computing devices, to interact with the organizations about the products and/or services offered by these organizations. Some large organizations may even provide specialized websites and/or customer portals for their customers that allow customers to view and/or purchase various products and/or services online, conduct transactions, and view and/or manage one or more accounts.

In some instances, however, information security risks may arise as customers use specialized websites and customer portals to interact with an organization. In addition, while large organizations may take many steps to ensure the security of customer information and/or user accounts, these organizations may wish to continue pursuing ever greater levels of security in protecting customer information and/or user accounts.

SUMMARY

Aspects of the disclosure relate to various systems and techniques that provide effective, efficient, scalable, and convenient ways of increasing the security of customer information and customer accounts, particularly in ways that can be applied to secure an online banking interface via which one or more transactions may be conducted.

For example, some aspects of the disclosure may provide ways of using one-time tokens (OTTs) to prompt a customer to accept or decline various requests that may be initiated via a customer portal, such as an online banking portal. In addition, push notifications (which may, e.g., utilize a push notification service provided in connection with a mobile device operating system) may be used to notify a customer about such tokens instead of other messaging techniques, such as text messaging and email, so as to ensure that such notifications and any associated one-time tokens reach only the one or more hardware devices that have been registered (e.g., with the organization providing the customer portal) as belonging to the customer. As additional requests are created via the customer portal, a server may push corresponding notifications to the customer's registered device(s), and for each request, a different and unique one-time token may be provided to the customer's registered device(s) that includes a prompt allowing the user to confirm or cancel the corresponding request. Additionally, in instances in which the customer portal is an online banking portal, the one-time tokens and/or their corresponding requests may be received, decrypted, and presented by a mobile banking application that is loaded on and/or executed on the customer's registered device(s). By implementing these techniques, an organization may be able to ensure that requests initiated via an online banking portal are legitimate, as a customer may be prompted to verify various kinds of requests initiated via the online banking portal by responding to notifications and prompts associated with unique one-time tokens sent to the customer's registered mobile device.

In accordance with one or more embodiments, a computing platform (which may, e.g., incorporate one or more processors, memory, and/or communication interfaces, as discussed in greater detail below) may receive, from a user computing device, a request to access an online banking portal using a user account. Based on the request to access the online banking portal, the computing platform may generate a notification for a registered mobile device linked to the user account. Subsequently, the computing platform may send the notification to the registered mobile device. After sending the notification to the registered mobile device, the computing platform may generate a one-time token message that includes a prompt for authorizing the user computing device to access the online banking portal using the user account. The computing platform then may send the one-time token message to the registered mobile device. Thereafter, the computing platform may receive token response input from the registered mobile device. If the token response input does not authorize the user computing device to access the online banking portal using the user account, the computing platform may prevent the user computing device from accessing the online banking portal using the user account. Alternatively, if the token response input does authorize the user computing device to access the online banking portal using the user account, the computing platform may provide the user computing device with access to the online banking portal using the user account.

In some embodiments, prior to generating the one-time token message, the computing platform may receive, from the registered mobile device, a message indicating that a user of the registered mobile device has been authenticated by a mobile banking application on the registered mobile device. In some instances, the mobile banking application on the registered mobile device may authenticate the user of the registered mobile device based on biometric input received from the user of the registered mobile device.

In some embodiments, the notification may be sent to the registered mobile device using a push notification service associated with an operating system of the registered mobile device. In some instances, prior to receiving the request to access the online banking portal using the user account, the computing platform may receive a request to register the registered mobile device as a push notification recipient. In addition, based on the request to register the registered mobile device, the computing platform may store device information for the registered mobile device.

Additionally or alternatively, in some instances, after receiving the request to register the registered mobile device, the computing platform may cause a certificate to be produced for the registered mobile device. In addition, the computing platform may cause the certificate to be provided to the registered mobile device. In some instances, the one-time token message may be encrypted based on the certificate before the one-time token message is sent to the registered mobile device. In addition, the registered mobile device may be configured to decrypt the one-time token message based on the certificate to present the prompt for authorizing the user computing device to access the online banking portal using the user account.

In some embodiments, a mobile banking application on the registered mobile device may be configured to present the prompt included in the one-time token message to a user of the registered mobile device.

In some embodiments, the computing platform may receive, via the online banking portal, and from the user computing device, a request to perform a transaction involving at least one financial account linked to the user account.

Based on the request to perform the transaction, the computing platform may generate a second notification for the registered mobile device linked to the user account. Subsequently, the computing platform may send the second notification to the registered mobile device. After sending the second notification to the registered mobile device, the computing platform may generate a second one-time token message that includes a prompt for authorizing the transaction. The computing platform then may send the second one-time token message to the registered mobile device. Thereafter, the computing platform may receive second token response input from the registered mobile device. If the second token response input does not authorize the transaction, the computing platform may cancel the request to perform the transaction. Alternatively, if the second token response input does authorize the transaction, the computing platform may cause the transaction to be performed.

In some embodiments, the second one-time token message may be encrypted based on a certificate associated with the registered mobile device before the second one-time token message is sent to the registered mobile device. In some instances, the registered mobile device may decrypt the second one-time token message based on the certificate to present the prompt for authorizing the transaction.

In some embodiments, a mobile banking application on the registered mobile device may be configured to present the prompt included in the second one-time token message to a user of the registered mobile device. In some instances, the mobile banking application may provide a soft login functionality that causes the mobile banking application to present a user interface that includes a list of pending one-time token requests without requiring user authentication. Additionally or alternatively, the second notification may deep link to the user interface of the mobile banking application that includes the list of pending one-time token requests. Additionally or alternatively, the second one-time token may have a time-to-live parameter that causes the second one-time token to expire after a predetermined amount of time elapses.

In some embodiments, the computing platform may be configured to generate an additional one-time token for authorizing a request to register a new device as a push notification recipient. Additionally or alternatively, the computing platform may be configured to generate an additional one-time token for authorizing a request to transfer an amount of funds that exceeds a predetermined threshold amount.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 4A-4J depict an illustrative event sequence for ensuring information security using one-time tokens in accordance with one or more example embodiments;

FIGS. 5-10 depict example graphical user interfaces for ensuring information security using one-time tokens in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
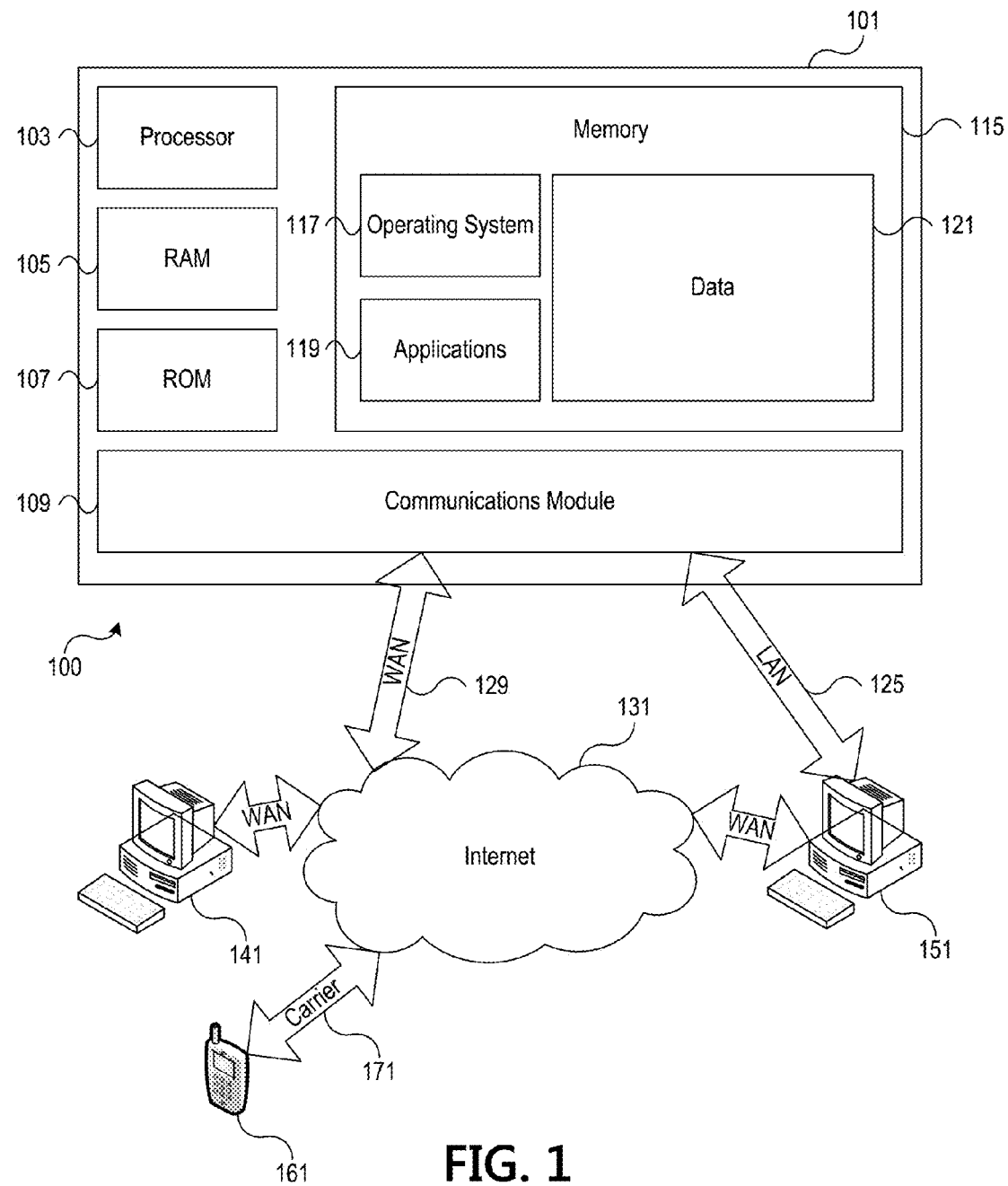
FIG. 1 depicts an illustrative operating environment in which various aspects of the disclosure may be implemented in accordance with one or more example embodiments.

FIG. 1 depicts an illustrative operating environment in which various aspects of the present disclosure may be implemented in accordance with one or more example embodiments. Referring to FIG. 1, computing system environment 100 may be used according to one or more illustrative embodiments. Computing system environment 100 is only one example of a suitable computing environment and is not intended to suggest any limitation as to the scope of use or functionality contained in the disclosure. Computing system environment 100 should not be interpreted as having any dependency or requirement relating to any one or combination of components shown in illustrative computing system environment 100.

Computing system environment 100 may include computing device 101 having processor 103 for controlling overall operation of computing device 101 and its associated components, including random-access memory (RAM) 105, read-only memory (ROM) 107, communications module 109, and memory 115. Computing device 101 may include a variety of computer readable media. Computer readable media may be any available media that may be accessed by computing device 101, may be non-transitory, and may include volatile and nonvolatile, removable and non-removable media implemented in any method or technology for storage of information such as computer-readable instructions, object code, data structures, program modules, or other data. Examples of computer readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by computing device 101.

Although not required, various aspects described herein may be embodied as a method, a data processing system, or as a computer-readable medium storing computer-executable instructions. For example, a computer-readable medium storing instructions to cause a processor to perform steps of a method in accordance with aspects of the disclosed embodiments is contemplated. For example, aspects of the method steps disclosed herein may be executed on a processor on computing device 101. Such a processor may execute computer-executable instructions stored on a computer-readable medium.

Software may be stored within memory 115 and/or storage to provide instructions to processor 103 for enabling computing device 101 to perform various functions. For example, memory 115 may store software used by computing device 101, such as operating system 117, application programs 119, and associated database 121. Also, some or all of the computer executable instructions for computing device 101 may be embodied in hardware or firmware. Although not shown, RAM 105 may include one or more applications representing the application data stored in RAM 105 while computing device 101 is on and corresponding software applications (e.g., software tasks) are running on computing device 101.

Communications module 109 may include a microphone, keypad, touch screen, and/or stylus through which a user of computing device 101 may provide input, and may also include one or more of a speaker for providing audio output and a video display device for providing textual, audiovisual and/or graphical output. Computing system environment 100 may also include optical scanners (not shown). Exemplary usages include scanning and converting paper documents, e.g., correspondence, receipts, and the like, to digital files.

Computing device 101 may operate in a networked environment supporting connections to one or more remote computing devices, such as computing devices 141, 151, and 161. Computing devices 141, 151, and 161 may be personal computing devices or servers that include any or all of the elements described above relative to computing device 101. Computing device 161 may be a mobile device (e.g., smart phone) communicating over wireless carrier channel 171.

The network connections depicted in FIG. 1 may include local area network (LAN) 125 and wide area network (WAN) 129, as well as other networks. When used in a LAN networking environment, computing device 101 may be connected to LAN 125 through a network interface or adapter in communications module 109. When used in a WAN networking environment, computing device 101 may include a modem in communications module 109 or other means for establishing communications over WAN 129, such as Internet 131 or other type of computer network. The network connections shown are illustrative and other means of establishing a communications link between the computing devices may be used. Various well-known protocols such as transmission control protocol/Internet protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other general purpose or special purpose computing system environments or configurations. Examples of well-known computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like.

Figure 2:
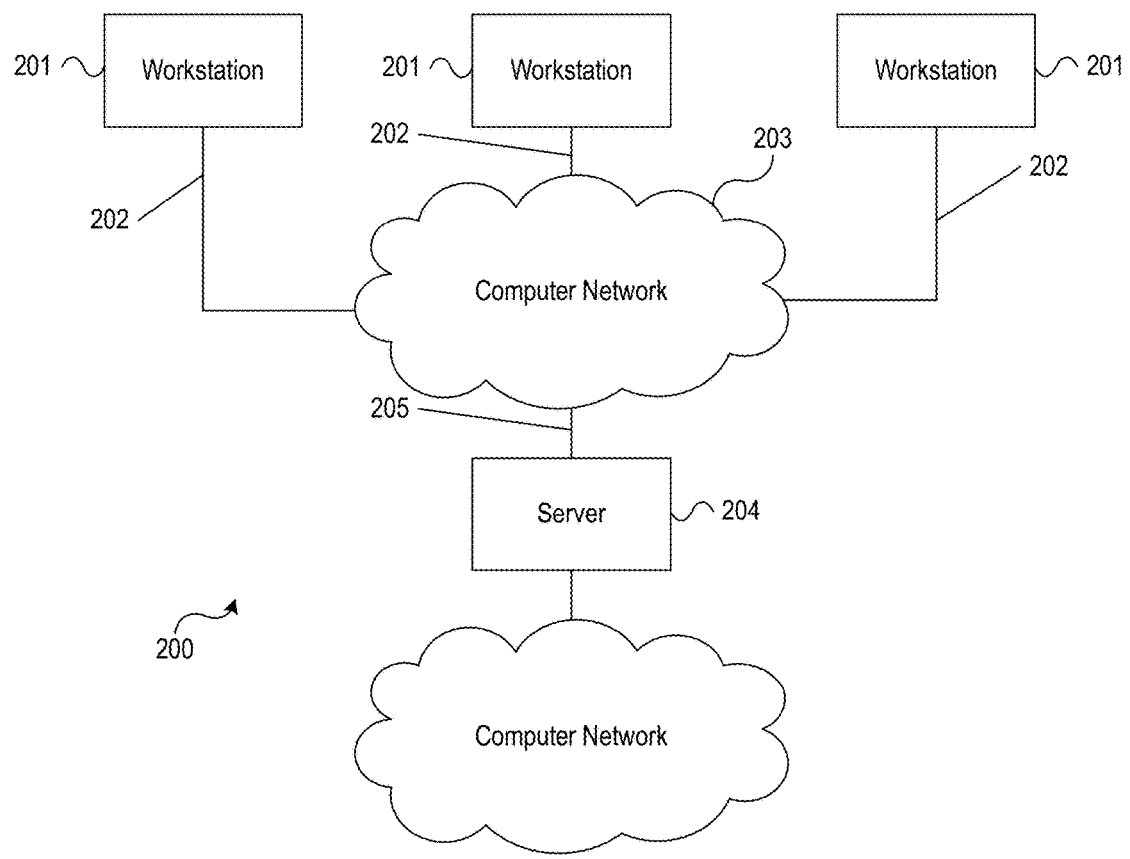
FIG. 2 depicts an illustrative block diagram of workstations and servers that may be used to implement the processes and functions of certain aspects of the present disclosure in accordance with one or more example embodiments.

FIG. 2 depicts an illustrative block diagram of workstations and servers that may be used to implement the processes and functions of certain aspects of the present disclosure in accordance with one or more example embodiments. Referring to FIG. 2, illustrative system 200 may be used for implementing example embodiments according to the present disclosure. As illustrated, system 200 may include one or more workstation computers 201. Workstation 201 may be, for example, a desktop computer, a smartphone, a wireless device, a tablet computer, a laptop computer, and the like. Workstations 201 may be local or remote, and may be connected by one of communications links 202 to computer network 203 that is linked via communications link 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, as well as network types developed in the future, and the like.

Figure 3:
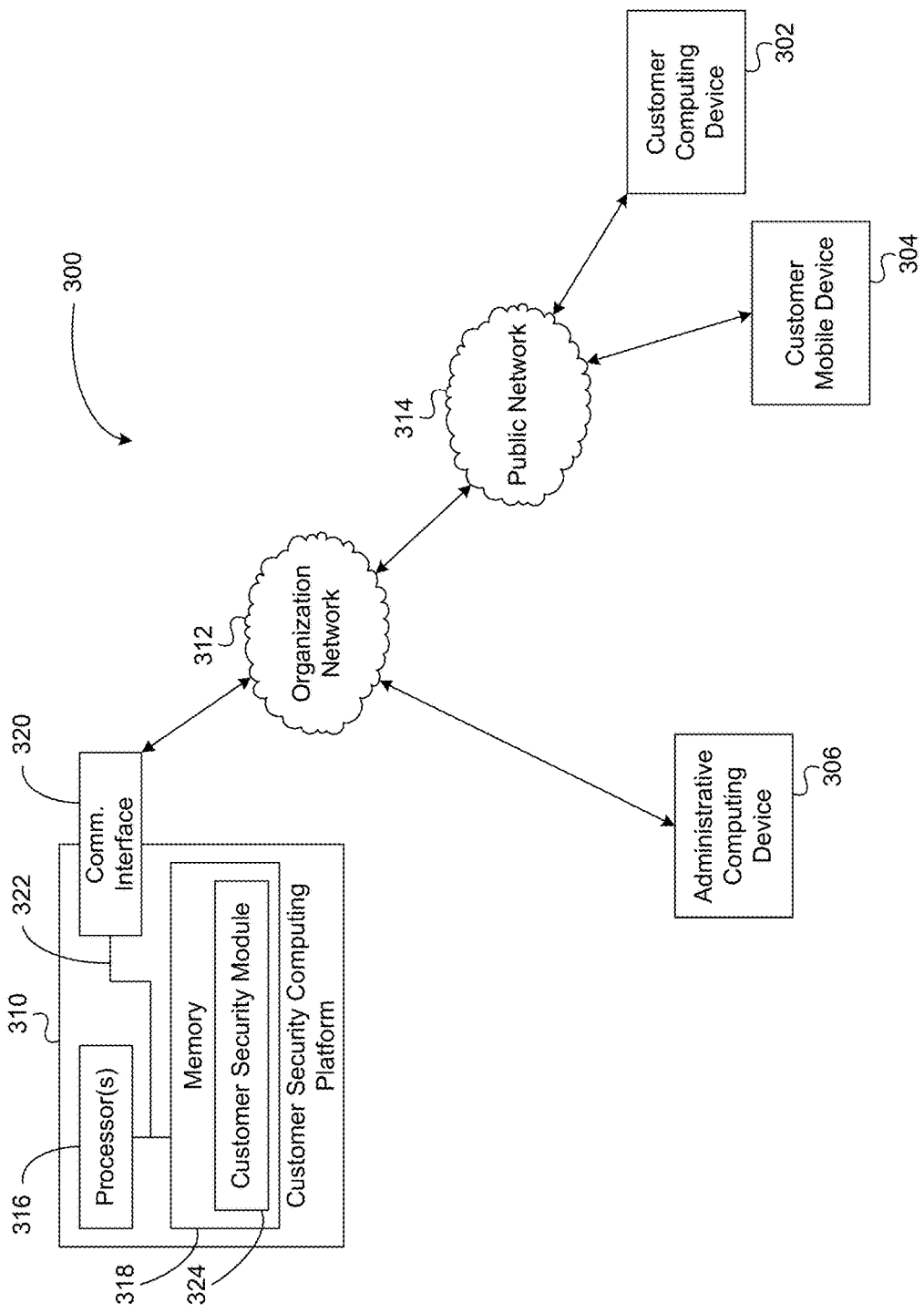
FIG. 3 depicts an illustrative computing environment for ensuring information security using one-time tokens in accordance with one or more example embodiments.

FIG. 3 depicts an illustrative computing environment for ensuring information security using one-time tokens in accordance with one or more example embodiments. Referring to FIG. 3, computing environment 300 may include one or more computing devices. For example, computing environment 300 may include a customer computing device 302 (which may, e.g., be used by a customer of an organization, such as a customer of a financial institution). Computing environment 300 may further include a customer mobile device 304 (which may, e.g., be a mobile computing device that is used by, linked to, and/or otherwise associated with the user of customer computing device 302). Computing environment 300 also may include an administrative computing device 306 (which may, e.g., be used by and/or operated by an administrative user or other individual who may be associated with the organization and who may administer and/or otherwise control various computing devices and/or computer systems that are operated by and/or otherwise associated with the organization). Customer computing device 302, customer mobile device 304, and administrative computing device 306 may be any type of computing device capable of receiving a user interface, receiving input via the user interface, and communicating the received input to one or more other computing devices. For example, customer computing device 302, customer mobile device 304, and administrative computing device 306 may be a desktop computer, laptop computer, tablet computer, smart phone, or the like. Computing environment 300 also may include one or more computing platforms. For example, computing environment 300 may include customer security computing platform 310. Customer security computing platform 310 may include one or more computing devices configured to perform one or more of the functions described herein. For example, customer security computing platform 310 may include one or more computers (e.g., laptop computers, desktop computers, servers, server blades, or the like).

Computing environment 300 also may include one or more networks, which may interconnect one or more of customer computing device 302, customer mobile device 304, administrative computing device 306, and customer security computing platform 310. For example, computing environment 300 may include organization network 312 and public network 314. Organization network 312 and/or public network 314 may include one or more sub-networks (e.g., LANs, WANs, or the like). Organization network 312 may be associated with a particular organization (e.g., a corporation, financial institution, educational institution, governmental institution, or the like) and may interconnect one or more computing devices associated with the organization. For example, administrative computing device 306 and customer security computing platform 310 may be associated with an organization (e.g., a financial institution), and organization network 312 may be associated with and/or operated by the organization, and may include one or more networks (e.g., LANs, WANs, VPNs, or the like) that interconnect administrative computing device 306 and customer security computing platform 310 and one or more other computing devices and/or computer systems that are used by, operated by, and/or otherwise associated with the organization. Public network 314 may connect organization network 312 and/or one or more computing devices connected thereto (e.g., administrative computing device 306 and customer security computing platform 310) with one or more networks and/or computing devices that are not associated with the organization. For example, customer computing device 302 and customer mobile device 304 might not be associated with an organization that operates organization network 312, and public network 314 may include one or more networks (e.g., the Internet) that connect customer computing device 302 and customer mobile device 304 to organization network 312 and/or one or more computing devices connected thereto (e.g., administrative computing device 306 and customer security computing platform 310).

Customer security computing platform 310 may include one or more processor(s) 316, memory 318, communication interface 320, and data bus 322. Data bus 322 may interconnect processor(s) 316, memory 318, and/or communication interface 320.

Communication interface 320 may be a network interface configured to support communication between customer security computing platform 310 and organization network 312, or one or more sub-networks thereof. Memory 318 may include one or more program modules comprising instructions that when executed by the processor(s) 316 cause customer security computing platform 310 to perform one or more functions described herein. For example, memory 318 may include customer security module 324, which may comprise instructions that when executed by processor(s) 316 cause customer security computing platform 310 to perform one or more functions described herein.

Figure 4B:
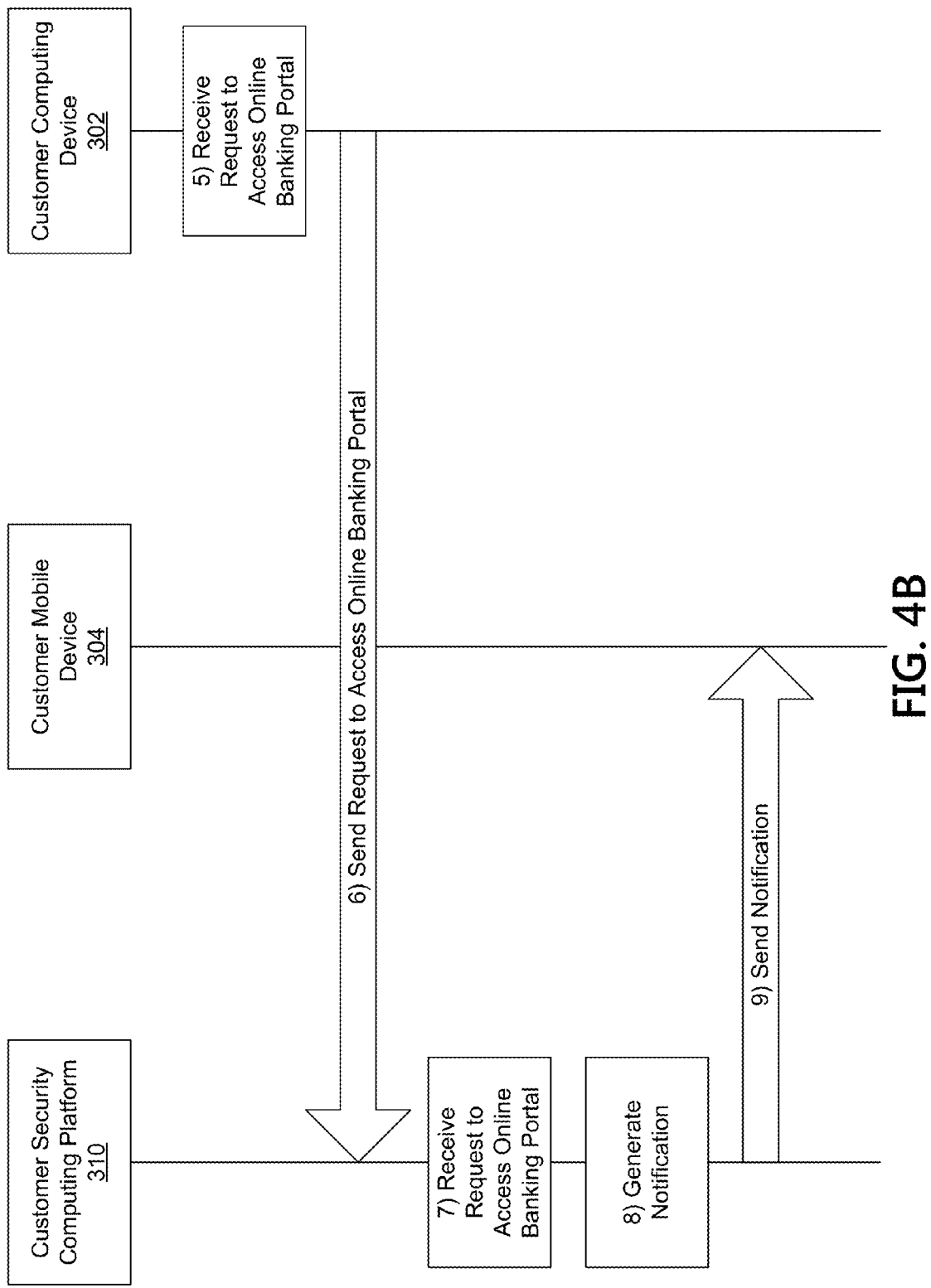

FIGS. 4A-4J depict an illustrative event sequence for ensuring information security using one-time tokens in accordance with one or more example embodiments. Referring to FIG. 4A, at step 1, customer security computing platform 310 may receive a request to register a mobile device. For example, at step 1, customer security computing platform 310 may receive a request to register customer mobile device 304 as a push notification recipient. In some instances, the request may originate via a customer portal provided by customer security computing platform 310, such as an online banking portal or other customer-facing website, from customer mobile device 304, and/or from another source. For example, in some instances, the request may originate from a computing device being used by a customer or an organization employee at a retail location, such as a bank teller assisting the customer with registering their mobile device at a banking center.

In one or more arrangements, the request to register the mobile device (which may, e.g., be received by customer security computing platform 310 at step 1) may include hardware details for the device to be registered (e.g., customer mobile device 304), such as a unique device identifier (UDID), an international mobile station equipment identity (IMEI), a device serial number, and/or the like. These details may enable customer security computing platform 310 to generate and send push notifications and/or other operating system-based messages to customer mobile device 304, as discussed in greater detail below. In some instances, the request to register the mobile device (which may, e.g., be received by customer security computing platform 310 at step 1) may include a device token for the mobile device (e.g., customer mobile device 304). Such a device token may be generated and/or otherwise provided by a push notification service that is provided by and/or in connection with an operating system of the mobile device (e.g., customer mobile device 304). In instances in which a device token is provided to customer security computing platform 310 during registration of customer mobile device 304, the generation and/or management of the device token may be handled by the push notification service.

At step 2, customer security computing platform 310 may store device information for customer mobile device 304 based on the request to register customer mobile device 304. For example, in storing device information for customer mobile device 304, customer security computing platform 310 may store any and/or all of the hardware details included in the request to register customer mobile device 304 and/or any other information included in the request to register customer mobile device 304, such as a device token and/or other information. As discussed below, such device information (which may, e.g., be stored by customer security computing platform 310 at step 2) may enable customer security computing platform 310 to generate and/or send one or more notifications to customer mobile device 304.

At step 3, customer security computing platform 310 may cause a certificate to be produced for customer mobile device 304. For example, in some instances, customer security computing platform 310 may create, issue, and/or otherwise produce a certificate for customer mobile device 304, while in other instances, customer security computing platform 310 may cause such a certificate to be created, issued, and/or otherwise produced for customer mobile device 304 by a certificate authority. The certificate may be a digital certificate that includes a public key and information specifying the identity of the certificate owner (e.g., customer mobile device 304). Additionally or alternatively, the certificate may be generated based on a private key maintained by customer mobile device 304 and/or by a user of customer mobile device 304. In one or more arrangements, the certificate may enable public-key cryptography to be used to encrypt data communications between customer security computing platform 310 and customer mobile device 304. For example, the certificate may enable an organization operating customer security computing platform 310 (which may, e.g., be a financial institution that provides an online banking portal to a user of customer mobile device 304) to send tokenized messages to customer mobile device 304. In addition, and as discussed in greater detail below, such tokenized messages may prompt a user of customer mobile device 304 to approve or decline various requests (which may, e.g., be generated via the online banking portal). In some instances, certificate generation and management may be handled by a push notification service (which may, e.g., be provided by or in connection with the operating system of customer mobile device 304). For example, the push notification service which may generate a device token for customer mobile device 304 also may be used to generate a certificate for customer mobile device 304 and/or provision customer mobile device 304 with the certificate for use in securing communications between customer mobile device 304 and customer security computing platform 310. In other instances, rather than using a certificate to secure communications with customer mobile device 304, customer security computing platform 310 may use the device token provided by the push notification service to facilitate trusted and/or encrypted communications with customer mobile device 304.

At step 4, customer security computing platform 310 may cause the certificate to be provided to customer mobile device 304. For example, at step 4, customer security computing platform 310 may send the certificate to customer mobile device 304. Additionally or alternatively, customer security computing platform 310 may cause a certificate authority to send and/or otherwise provide the certificate to customer mobile device 304.

Referring to FIG. 4B, at step 5, customer computing device 302 may receive a request to access an online banking portal. At step 6, customer computing device 302 may send a request to access an online banking portal to customer security computing platform 310. At step 7, customer security computing platform 310 may receive a request to access an online banking portal. For example, at step 7, customer security computing platform 310 may receive, from customer computing device 302, a request to access an online banking portal using a user account. Such a request may, for instance, include user account details, such as a username, password, and/or the like, which may identify the user account to which the user of customer computing device 302 is requesting access via the online banking portal. In some instances, the online banking portal may, for example, be a customer-facing online banking website that is provided by a financial institution, and the online banking website may include a number of interactive user interfaces that are configured to allow users to access financial account information, transfer funds between accounts, pay bills, request and/or perform other types of transactions using one or more financial accounts that may be maintained by the financial institution, and/or view other information associated with the financial institution. In other instances, rather than receiving a request to access an online banking portal, customer security computing platform 310 could similarly receive a request to access another type of customer portal. Such a customer portal may, for instance, be a website that is provided by an organization for its customers and potential customers, and the website may include a number of interactive user interfaces via which customers and potential customers may access information associated with the organization.

At step 8, customer security computing platform 310 may generate a notification. For example, based on the request to access the online banking portal (which may, e.g., have been received by customer security computing platform 310 at step 7), customer security computing platform 310 may, at step 8, generate a notification for a registered mobile device linked to the user account (e.g., customer mobile device 304, which may be linked to the user account identified in the request to access the online banking portal). In one or more arrangements, the notification may, for instance, be generated based on user account details (e.g., user identity information) included in the request to access the online banking portal, such as a username, a device identifier, and/or the like. Additionally or alternatively, the notification (which may, e.g., be generated by customer security computing platform 310 at step 8) may be configured to inform a recipient (which may, e.g., be the user of customer mobile device 304) that one or more requests, such as the request to access the online banking portal, are pending review by the recipient.

Figure 5:
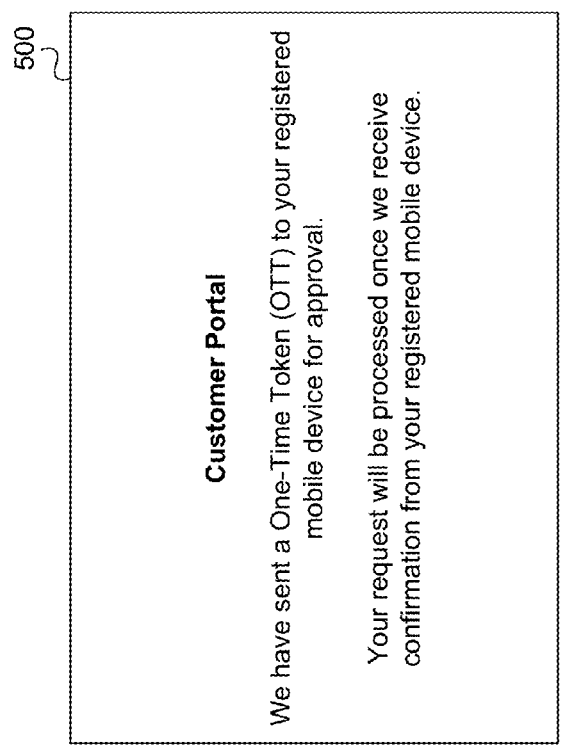

At step 9, customer security computing platform 310 may send the notification to customer mobile device 304. In some instances, customer security computing platform 310 may send the notification to customer mobile device 304 directly as a message or other communication from customer security computing platform 310 to customer mobile device 304, while in other instances, customer security computing platform 310 may cause a notification to be sent to customer mobile device 304 via one or more other servers and/or devices (which may, e.g., provide a notification service). For example, in some instances, the notification may be sent to customer mobile device 304 using a push notification service associated with an operating system of customer mobile device 304. For example, the notification may be sent as an operating system message to customer mobile device 304 using a device identifier and/or using other device details that may have been received and/or stored by customer security computing platform 310 during a device registration process (e.g., at steps 1-4 discussed above). In some instances, prior to generating and/or sending the notification to customer mobile device 304, customer security computing platform 310 may first request, receive, and/or validate login credentials from customer computing device 302, such as a username, password, and/or the like, that may correspond to the user account to which the user of customer computing device 302 may be requesting access. Additionally or alternatively, customer security computing platform 310 may cause customer computing device 302 to display and/or otherwise present a user interface indicating that a notification and/or request has been sent to customer mobile device 304 to approve the request to access the online banking portal received from customer computing device 302. For example, customer security computing platform 310 may cause customer computing device 302 to display and/or otherwise present a graphical user interface similar to graphical user interface 500, which is illustrated in FIG. 5. As seen in FIG. 5, graphical user interface 500 may include text and/or other information indicating that a notification and/or a one-time token has been sent to customer mobile device 304 for approval and/or that the request to access the online banking portal will be processed if and/or when such approval is received from customer mobile device 304, as discussed in greater detail below.

Figure 6:
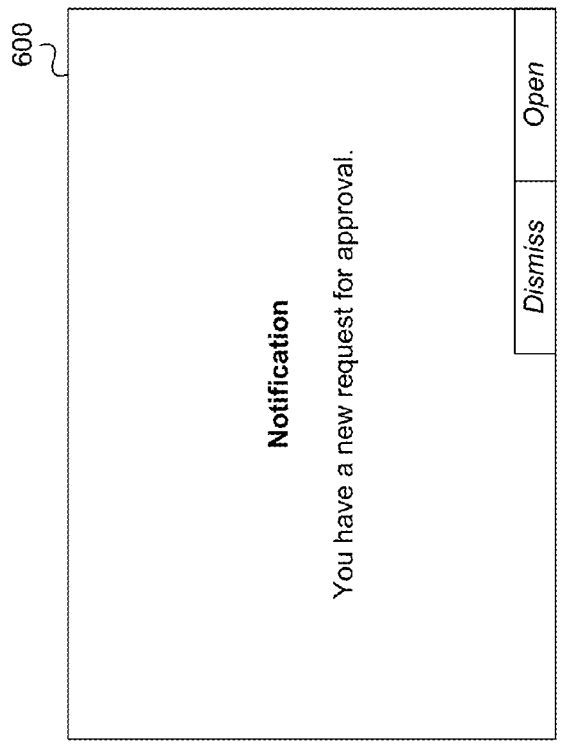

Referring to FIG. 4C, at step 10, customer mobile device 304 may receive the notification. In some instances, customer mobile device 304 may receive the notification from customer security computing platform 310, while in other instances, customer mobile device 304 may receive the notification from another server or device that may provide a push notification service used in sending the notification. At step 11, customer mobile device 304 may present the notification. For example, in presenting the notification, customer mobile device 304 may display and/or otherwise present a graphical user interface similar to graphical user interface 600, which is illustrated in FIG. 6. As seen in FIG. 6, graphical user interface 600 may include text and/or other information indicating that there is a request requiring the user's attention and/or approval.

Referring again to FIG. 4C, at step 12, customer mobile device 304 may receive input requesting to open the notification. In response to receiving the input requesting to open the notification at step 12, customer mobile device 304 may, at step 13, open a mobile banking application. For example, customer mobile device 304 may open the mobile banking application based on the notification identifying the mobile banking application as being a mobile application that is linked to and/or otherwise capable of presenting content associated with the notification. In other instances, rather than opening a mobile banking application, customer mobile device 304 may open another application which may, for instance, be linked to and/or otherwise capable of presenting content associated with the notification.

Figure 4D:
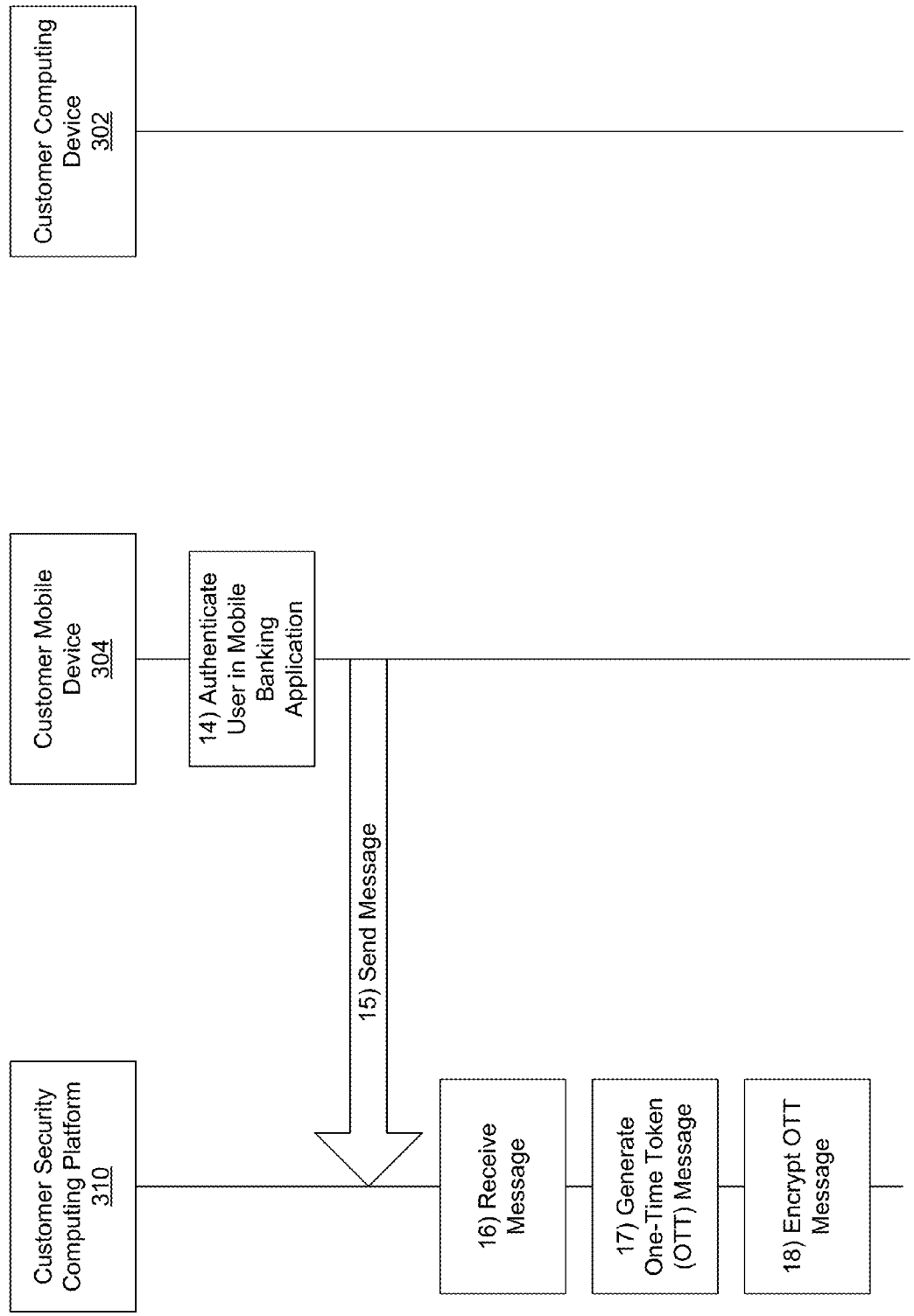

Referring to FIG. 4D, at step 14, customer mobile device 304 may authenticate the user of customer mobile device 304 in the mobile banking application. In authenticating the user of customer mobile device 304 in the mobile banking application, customer mobile device 304 may, for instance, prompt the user to enter a username and/or password. Additionally or alternatively, in authenticating the user of customer mobile device 304 in the mobile banking application, customer mobile device 304 may prompt the user to provide biometric input, such as fingerprint biometric input, voice biometric input, facial image recognition biometric, and/or the like. Such biometric input may, for example, be captured by one or more fingerprint scanners, microphones, cameras, and/or other sensors that may be included in and/or coupled to customer mobile device 304.

Based on authenticating the user of customer mobile device 304 (e.g., at step 14), customer mobile device 304 may, at step 15, send a message to customer security computing platform 310 indicating that the user of customer mobile device 304 has been authenticated. At step 16, customer security computing platform 310 may receive the message from customer mobile device 304. For example, at step 16, customer security computing platform 310 may receive, from customer mobile device 304, a message indicating that a user of customer mobile device 304 has been authenticated by a mobile banking application on the registered mobile device (e.g., customer mobile device 304). In some instances, the mobile banking application on customer mobile device 304 may authenticate the user of customer mobile device 304 based on biometric input received from the user of customer mobile device 304, as discussed above. In these instances, the message (which may, e.g., be sent by customer mobile device 304 at step 15 and received by customer security computing platform 310 at step 16) may include information indicating that the user of customer mobile device 304 was authenticated based on biometric input received from the user of customer mobile device 304, as this may enable customer security computing platform 310 to establish a relatively higher level of trust with respect to customer mobile device 304 and/or customer computing device 302 (e.g., than if such biometric input was not used in authenticating the user of customer mobile device 304).

At step 17, customer security computing platform 310 may generate a one-time token message. For example, after sending the notification to customer mobile device 304 (e.g., at step 9), customer security computing platform 310 may, at step 17, generate a one-time token message that includes a prompt for authorizing customer computing device 302 to access the online banking portal using the user account (which may, e.g., have been identified in the request to access the online banking portal received by customer security computing platform 310 at step 7). At step 18, customer security computing platform 310 may encrypt the one-time token message. For example, at step 18, customer security computing platform 310 may encrypt the one-time token message generated at step 17 using a certificate, a device token, and/or the like. In some instances, the one-time token message may be encrypted based on the certificate produced by customer security computing platform 310 at step 3, and as discussed below, such encryption may be performed (e.g., by customer security computing platform 310) before the one-time token message is sent to customer mobile device 304.

Referring to FIG. 4E, at step 19, customer security computing platform 310 may send the one-time token message to customer mobile device 304. In alternative arrangements, customer security computing platform 310 may generate, encrypt, and/or send the one-time token message to customer mobile device 304 along with the notification (e.g., at step 9) and/or before customer mobile device 304 authenticates the user of customer mobile device 304 (e.g., at step 14). In these alternative arrangements, customer mobile device 304 might not decrypt or present the one-time token message until the user of customer mobile device 304 is authenticated, however.

At step 20, customer mobile device 304 may receive the one-time token message from customer security computing platform 310. At step 21, customer mobile device 304 may decrypt the one-time token message received from customer security computing platform 310. For example, at step 21, customer mobile device 304 may decrypt the one-time token message using a certificate, a device token, and/or the like. In some instances, customer mobile device 304 may decrypt the one-time token message based on the certificate (which may, e.g., have been produced by customer security computing platform 310 at step 3) so as to present the prompt for authorizing the customer computing device 302 to access the online banking portal using the user account, as illustrated below.

Figure 7:
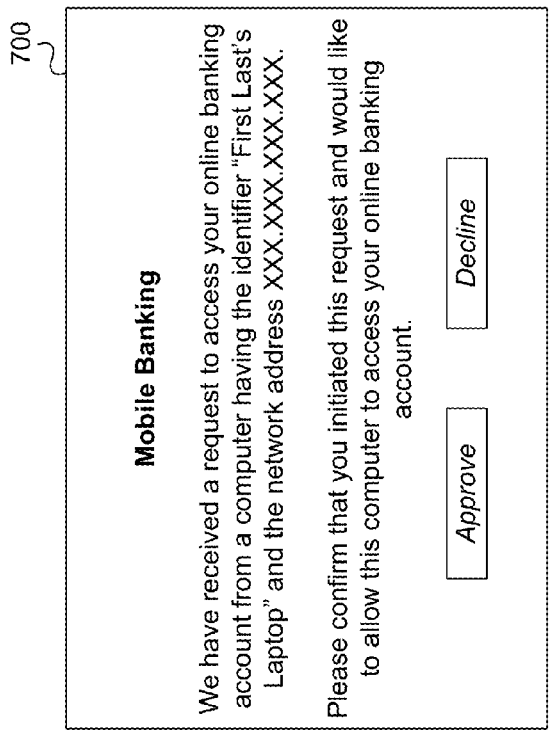

At step 22, customer mobile device 304 may present the one-time token message. In presenting the one-time token message, customer mobile device 304 may, for instance, present a prompt included in the one-time token message, and such a prompt may, for instance, correspond to the request received by customer security computing platform 310 from customer computing device 302 and may prompt the user of customer mobile device 304 to approve or deny the request. Additionally or alternatively, a mobile banking application on customer mobile device 304 may be configured to present the prompt included in the one-time token message to a user of customer mobile device 304. For example, the mobile banking application opened by customer mobile device 304 (e.g., at step 13) may read information from and/or present the prompt included in the one-time token message received by customer mobile device 304 from customer security computing platform 310 (e.g., at step 22). In presenting the one-time token message, customer mobile device 304 may display and/or otherwise present a graphical user interface similar to graphical user interface 700, which is illustrated in FIG. 7. As seen in FIG. 7, graphical user interface 700 may include text and/or other information identifying the request that has been received by customer security computing platform 310 from customer computing device 302 and one or more controls that allow the user of customer mobile device 304 to approve or decline the request.

Referring again to FIG. 4E, at step 23, customer mobile device 304 may receive token response input. For example, at step 23, customer mobile device 304 may receive input from the user of customer mobile device 304 that approves or declines the request identified in the prompt associated with the one-time token that was presented by customer mobile device 304 at step 22. Referring to FIG. 4F, at step 24, customer mobile device 304 may send the token response input to customer security computing platform 310.

Figure 8:
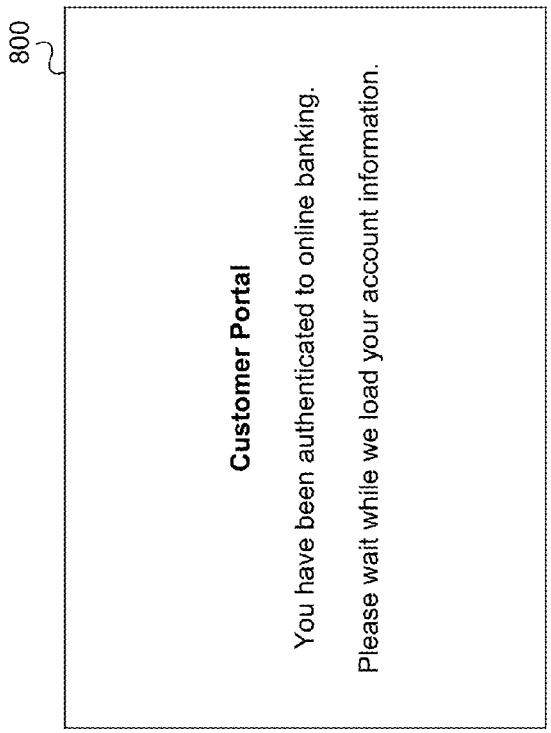

At step 25, customer security computing platform 310 may receive the token response input from customer mobile device 304 and may provide or prevent access to the online banking portal based on the token response input. For example, at step 25, customer security computing platform 310 may receive token response input from customer mobile device 304. In addition, if the token response input does not authorize customer computing device 302 to access the online banking portal using the user account, customer security computing platform 310 may, at step 25, prevent customer computing device 302 from accessing the online banking portal using the user account. Alternatively, if the token response input does authorize customer computing device 302 to access the online banking portal using the user account, customer security computing platform 310 may, at step 25, provide customer computing device 302 with access to the online banking portal using the user account. In preventing customer computing device 302 from accessing the online banking portal, customer security computing platform 310 may, for example, generate and/or send one or more error messages to customer computing device 302 indicating that the login attempt has failed, that the request to access the user account was denied, and/or that customer computing device 302 is otherwise unable to access the user account. Alternatively, in providing customer computing device 302 with access to the online banking portal, customer security computing platform 310 may, for example, generate and/or send one or more webpages and/or user interfaces associated with the portal that enable the user of customer computing device 302 to view and/or interact with the various functions and/or information that may be available via the online banking portal, such as account information, funds transfer functions, bill pay functions, and/or the like. Additionally or alternatively, in providing customer computing device 302 with access to the online banking portal, customer security computing platform 310 may, for example, cause customer computing device 302 to display and/or otherwise present a graphical user interface similar to graphical user interface 800, which is illustrated in FIG. 8. As seen in FIG. 8, graphical user interface 800 may include text and/or other information indicating that the user of customer computing device 302 has been authenticated to the online banking portal and/or that account information associated with the user account to which the user of customer computing device 302 has requested access is being loaded by customer security computing platform 310.

At step 26, customer security computing platform 310 may receive a transaction request via the online banking portal. For example, at step 26, customer security computing platform 310 may receive, via the online banking portal, a request to perform a transaction involving at least one financial account linked to the user account (e.g., the user account to which customer security computing platform 310 may be providing customer computing device 302 with access to via the online banking portal). Such a request may, for example, be received from customer computing device 302 and/or a user of customer computing device 302 via the online banking portal provided by customer security computing platform 310. Additionally or alternatively, the transaction request (which may, e.g., be received by customer security computing platform 310 at step 26) may include and/or correspond to a request to execute a particular transaction involving one or more accounts, a request to enroll or register a new device as a push notification recipient, a request to pay one or more bills via an online bill pay interface, a request to transfer funds to another account (e.g., for a relatively high-value transaction, such as a transfer exceeding $10,000 or another predetermined amount), a request to execute a brokerage transaction, a request to perform a transaction involving a home mortgage or home equity line of credit account, or the like.

At step 27, customer security computing platform 310 may generate a notification. For example, based on the request to perform the transaction (which may, e.g., be received by customer security computing platform 310 at step 26), customer security computing platform 310 may generate a second notification for customer mobile device 304. In generating the second notification for customer mobile device 304 at step 27, customer security computing platform 310 may generate a notification similar to how customer security computing platform 310 generated a notification for customer mobile device 304 at step 8, as discussed above. At step 28, customer security computing platform 310 may send the second notification to customer mobile device 304. Additionally or alternatively, customer security computing platform 310 may cause the second notification to be sent to customer mobile device 304 (e.g., by a push notification service, as discussed above).

Referring to FIG. 4G, at step 29, customer mobile device 304 may receive the notification. At step 30, customer mobile device 304 may present the notification, similar to how customer mobile device 304 may present a notification at step 11, as discussed above. At step 31, customer mobile device 304 may receive input requesting to open the notification. Based on receiving the input requesting to open the notification, customer mobile device 304 may, at step 32, open the mobile banking application.

Figure 4H:
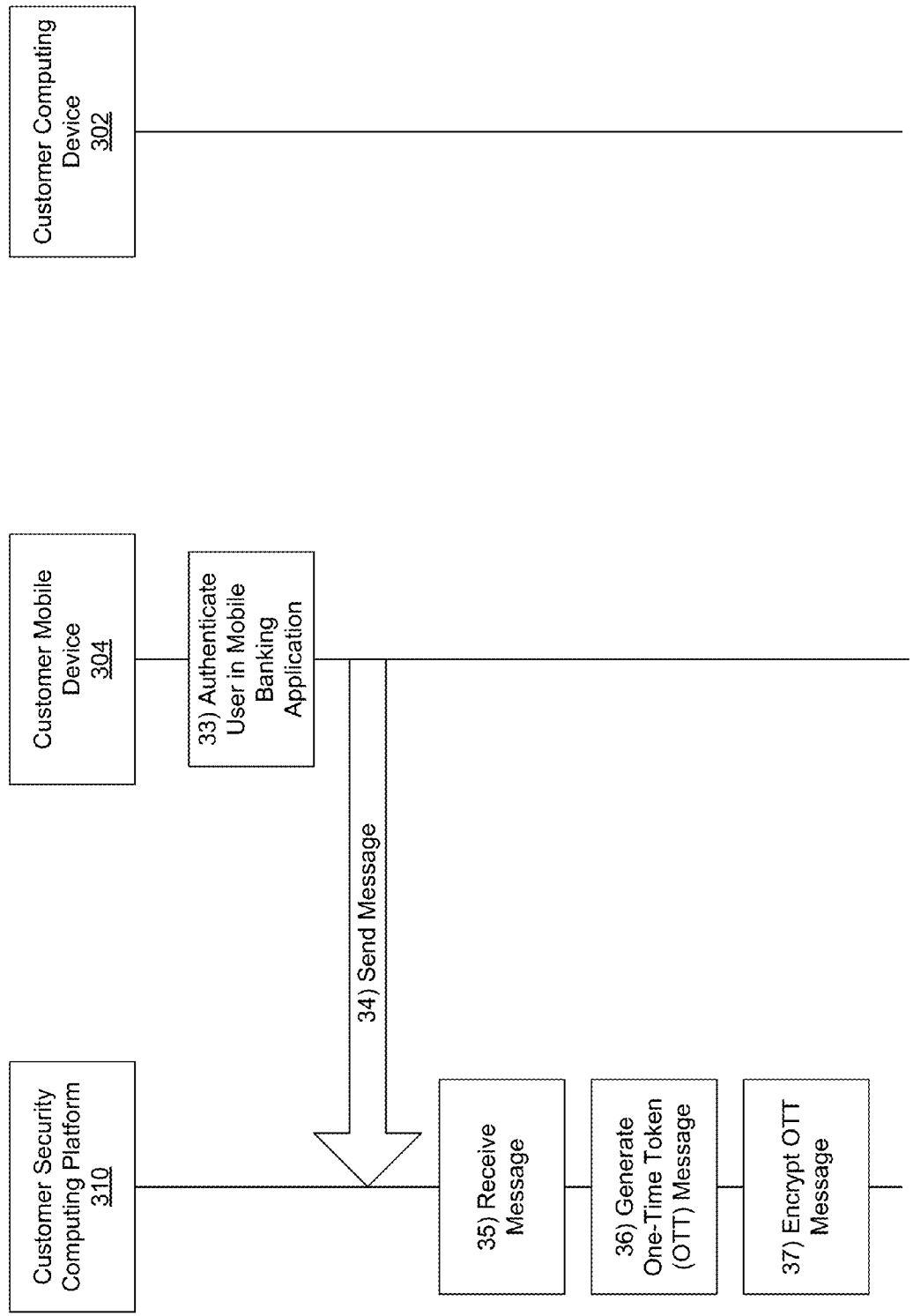

Referring to FIG. 4H, at step 33, customer mobile device 304 may authenticate the user in the mobile banking application, similar to how the user may be authenticated in the mobile banking application at step 14, as discussed above. Alternatively, if the user has already been authenticated to mobile banking application (e.g., at step 14) and/or has not closed the mobile banking application since being previously authenticated or otherwise timed-out the previous authentication status, the input requesting to open the notification may cause customer mobile device 304 to present a user interface that presents the token associated with the notification and/or a list of tokens that are pending approval by the user of customer mobile device 304. In this way, the notification may deep link the user of customer mobile device 304 to a user interface presenting a token corresponding to the notification and/or to a list of tokens that are pending approval by the user of customer mobile device 304, as discussed in greater detail below.

Based on authenticating the user of customer mobile device 304 in the mobile banking application, customer mobile device 304 may, at step 34, send a message to customer security computing platform 310 indicating that the user of customer mobile device 304 has been authenticated. At step 35, customer security computing platform 310 may receive the message from customer mobile device 304. At step 36, customer security computing platform 310 may generate a one-time token message. For example, after sending the second notification to customer mobile device 304, customer security computing platform 310 may, at step 36, generate a second one-time token message that includes a prompt for authorizing the transaction (which may, e.g., have been requested in connection with the transaction request received by customer security computing platform 310 at step 26). In generating the second one-time token message at step 36, customer security computing platform 310 may, for example, generate the one-time token message similar to how such a one-time token message was generated by customer security computing platform 310 at step 17, as discussed above.

At step 37, customer security computing platform 310 may encrypt the one-time token message. For example, at step 37, customer security computing platform 310 may encrypt the one-time token message generated at step 36 using a certificate, a device token, and/or the like. In some instances, the second one-time token message may be encrypted based on the certificate produced by customer security computing platform 310 at step 3, and as discussed below, such encryption may be performed (e.g., by customer security computing platform 310) before the second one-time token message is sent to customer mobile device 304.

Referring to FIG. 4I, at step 38, customer security computing platform 310 may send the second one-time token message to customer mobile device 304. In alternative arrangements, customer security computing platform 310 may generate, encrypt, and/or send the second one-time token message to customer mobile device 304 along with the notification and/or before customer mobile device 304 authenticates the user of customer mobile device 304. In these alternative arrangements, customer mobile device 304 might not decrypt or present the second one-time token message until the user of customer mobile device 304 is authenticated, however.

At step 39, customer mobile device 304 may receive the second one-time token message from customer security computing platform 310. At step 40, customer mobile device 304 may decrypt the second one-time token message received from customer security computing platform 310. For example, at step 40, customer mobile device 304 may decrypt the second one-time token message using a certificate, a device token, and/or the like. In some instances, customer mobile device 304 may decrypt the second one-time token message based on the certificate (which may, e.g., have been produced by customer security computing platform 310 at step 3) so as to present the prompt for authorizing the requested transaction to be executed, as illustrated below.

At step 41, customer mobile device 304 may present the second one-time token message. In presenting the second one-time token message, customer mobile device 304 may, for instance, present a prompt included in the second one-time token message, and such a prompt may, for instance, correspond to the transaction request received by customer security computing platform 310 from customer computing device 302 and may prompt the user of customer mobile device 304 to approve or deny the transaction request. Additionally or alternatively, a mobile banking application on customer mobile device 304 may be configured to present the prompt included in the second one-time token message to a user of customer mobile device 304. For example, the mobile banking application opened by customer mobile device 304 (e.g., at step 32) may read information from and/or present the prompt included in the second one-time token message received by customer mobile device 304 from customer security computing platform 310 (e.g., at step 39). In presenting the second one-time token message, customer mobile device 304 may display and/or otherwise present a graphical user interface similar to graphical user interface 900, which is illustrated in FIG. 9. As seen in FIG. 9, graphical user interface 900 may include text and/or other information identifying the transaction request that has been received by customer security computing platform 310 from customer computing device 302 and one or more controls that allow the user of customer mobile device 304 to approve or decline the transaction request. Additionally or alternatively, in presenting the second one-time token message, customer mobile device 304 may display and/or otherwise present a graphical user interface similar to graphical user interface 1000, which is illustrated in FIG. 10. As seen in FIG. 10, graphical user interface 1000 may include text and/or other information identifying a list of pending transaction requests that are pending approval by the user of customer mobile device 304. In addition, graphical user interface 1000 may include an individual set of "approve" and "decline" links or buttons for each of the pending transaction requests that are pending approval by the user of customer mobile device 304, as well as an "approval all" and a "decline all" link or button that allows the user of customer mobile device 304 to approve or decline all of the transaction requests that are pending approval, respectively.

In some embodiments, the second one-time token may have a time-to-live parameter that causes the second one-time token to expire after a predetermined amount of time elapses. For example, any and/or all of the tokenized requests that may correspond to the one-time tokens that are generated by customer security computing platform 310 may have an individual, particular time to live value (e.g., two hours, two days, and/or the like). The time to live value for a particular token may vary depending on the type of request for which the one-time token has been generated, and a number of tokens may build up and may be pending approval by a user (e.g., of customer mobile device 304) at any one time, as a result of the user creating multiple requests via the online banking portal (e.g., while interacting with customer computing device 302). As an example, a one-time token that corresponds to a request to enroll and/or register a new device as a push notification recipient may have a time to live value of fifteen minutes. As another example, a one-time token that corresponds to a request to approve a brokerage transaction may have a time to live value of one hour. As another example, a one-time token that corresponds to a request to transfer funds to another account may have a time to live value of two hours. As another example, a one-time token that corresponds to a request to approve a bill pay transaction may have a time to live value of two days. After the time to live of a particular token elapses, customer security computing platform 310 may consider the token expired and may automatically decline and/or cancel the request corresponding to the expired token.

In some embodiments, the mobile banking application may provide a soft login functionality that causes the mobile banking application to present a user interface that includes a list of pending one-time token requests without requiring user authentication. For example, in some instances, there may be a "soft login" feature of the mobile banking application such that the user interface of the application may present a list of pending token requests before and/or without authenticating the user of customer mobile device 304. In these instances, however, the mobile banking application still might not allow the user of customer mobile device 304 to approve or decline any of the pending requests until the user of customer mobile device 304 is authenticated. Additionally or alternatively, the notification that is generated by customer security computing platform 310 may, in some embodiments, deep link to the user interface of the mobile banking application that includes the list of pending one-time token requests. For example, upon receiving input requesting to open a notification indicating that one or more requests are pending, customer mobile device 304 may open the mobile banking application to a user interface that includes a list of all pending one-time token requests, without presenting any other or additional user interface screens of the mobile banking application (which may, e.g., be directed to other features not related to approving or declining tokenized requests).

Referring again to FIG. 4I, at step 42, customer mobile device 304 may receive second token response input. For example, at step 42, customer mobile device 304 may receive input from the user of customer mobile device 304 that approves or declines the request identified in the prompt associated with the second one-time token that was presented by customer mobile device 304 at step 41. Referring to FIG. 4J, at step 43, customer mobile device 304 may send the second token response input to customer security computing platform 310.

At step 44, customer security computing platform 310 may receive the second token response input from customer mobile device 304 and may execute or cancel the requested transaction corresponding to the second one-time token based on the second token response input. For example, at step 44, customer security computing platform 310 may receive second token response input from customer mobile device 304. In addition, if the second token response input does not authorize the requested transaction (which may, e.g., have been requested in connection with the transaction request received by customer security computing platform 310 at step 26), customer security computing platform 310 may, at step 44, cancel the request to perform the transaction. Alternatively, if the second token response input does authorize the requested transaction, customer security computing platform 310 may, at step 44, cause the requested transaction to be performed. In this way, for example, a tokenized message (e.g., the second one-time token message) may facilitate verification and/or execution of a transaction on one computing device (e.g., customer mobile device 304) that was requested and/or staged on another, different computing device (e.g., customer computing device 302). In canceling the request to perform the transaction, customer security computing platform 310 may, for example, generate and/or send one or more error messages to customer computing device 302 indicating that the transaction has been canceled, that the transaction was not authorized or verified, and/or that the transaction is otherwise unable to be performed. Alternatively, in causing the requested transaction to be performed, customer security computing platform 310 may, for example, send one or more messages to one or more other financial systems operating by the financial institution that include commands causing the transaction to be performed (e.g., causing funds to be transferred, causing a device to be registered, causing a request to be executed, and/or the like).

As a user of customer computing device 302 creates additional requests via the online banking portal, any and/or all of the steps discussed above may be repeated to generate an additional one-time token for each additional request. For example, customer security computing platform 310 may generate an additional one-time token for authorizing an additional request to register a new device as a push notification recipient. As another example, customer security computing platform 310 may generate an additional one-time token for authorizing an additional request to transfer an amount of funds that exceeds a predetermined threshold amount.

In some arrangements, a user of customer computing device 302 may register multiple devices as push notification recipients, and customer security computing platform 310 may send notifications to all of the registered devices for the user to allow the user to approve and/or decline tokenized requests, similar to how such requests may be approved or declined in the examples discussed above. Additionally or alternatively, in some instances, customer security computing platform 310 may automatically generate a tokenized request (e.g., a one-time token). For example, customer security computing platform 310 may automatically generate a one-time token message to prompt a user of customer mobile device 304 to approve a transfer of funds from their savings account to their checking account to prevent their checking account from falling below a certain threshold amount (e.g., as a result of a pending transaction drawn on the user's checking account).

Moreover, certain aspects of the disclosure may provide a number of advantages over conventional systems. For example, by sending an operating system-based message to a registered mobile device (e.g., customer mobile device 304) for approval instead of sending an email or text-message notification (e.g., using SMS, MMS, or the like), an organization, such as a financial institution, can ensure that the message reaches the intended recipient, as email messages and text messages can be intercepted and/or otherwise received and/or accessed by unintended and/or unauthorized persons. In addition, where encryption and/or certificates are used (e.g., in the examples discussed above), additional security may be provided, as by sending a tokenized message in an encrypted form using a certificate, an organization can ensure that such a tokenized message can only be viewed and/or accepted on a registered device. For example, aspects of the disclosure may provide enhanced security because the tokenized messages discussed above may be sent only to registered hardware, and the user of such hardware may be required to authenticate (in some cases using biometrics) on the registered hardware prior to viewing and/or approving any and/or all of the requests associated with such tokenized messages.

Figure 11:
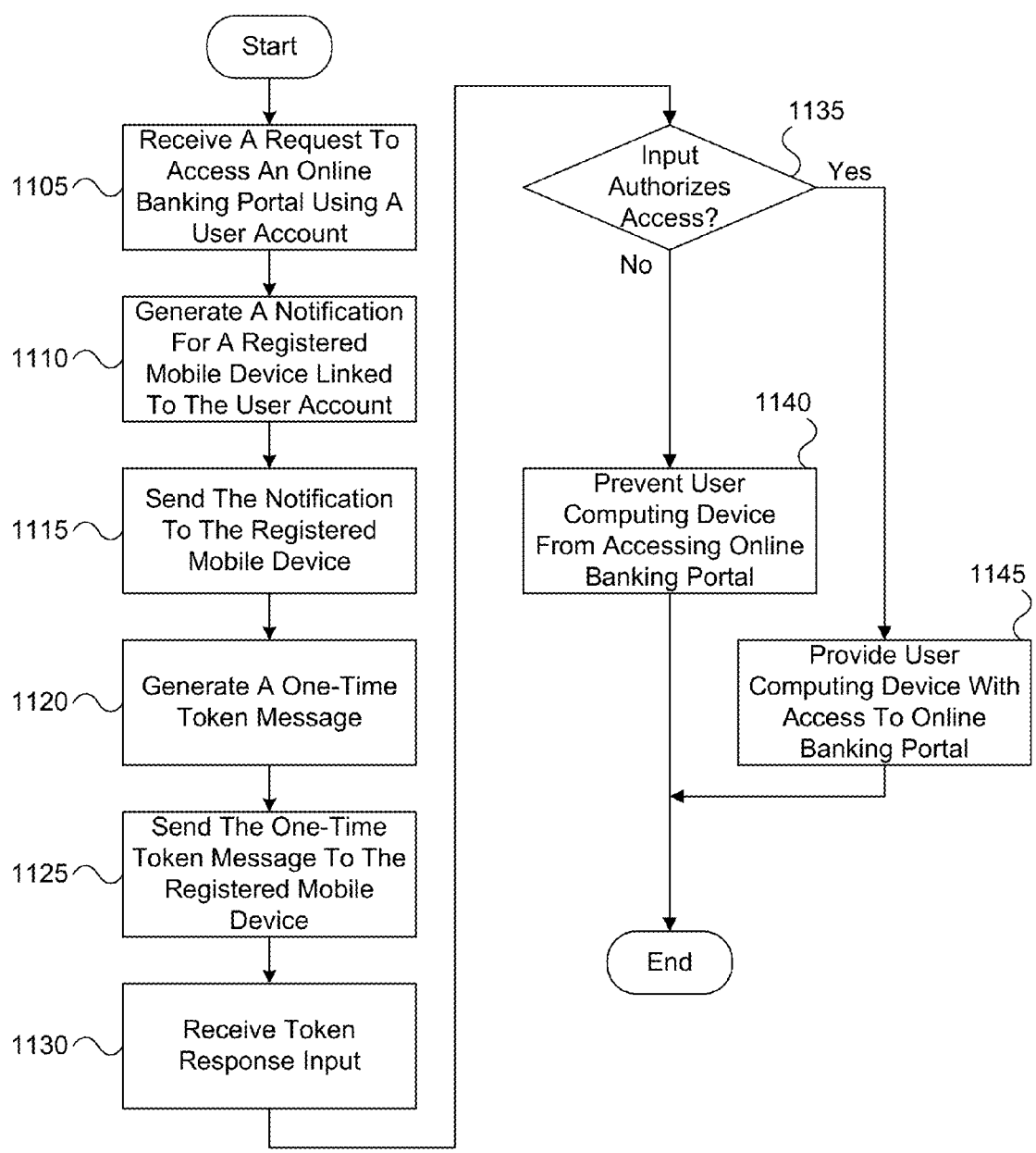
FIG. 11 depicts an illustrative method for ensuring information security using one-time tokens in accordance with one or more example embodiments.

FIG. 11 depicts an illustrative method for ensuring information security using one-time tokens in accordance with one or more example embodiments. Referring to FIG. 11, at step 1105, a computing platform may receive a request to access an online banking portal using a user account from a user computing device. At step 1110, the computing platform may generate a notification for a registered mobile device linked to the user account. At step 1115, the computing platform may send the notification to the registered mobile device. At step 1120, the computing platform may generate a one-time token message. At step 1125, the computing platform may send the one-time token message to the registered mobile device. At step 1130, the computing platform may receive token response input. At step 1135, the computing platform may determine whether the token response input authorizes the request to access the online banking portal. If the computing platform determines that the token response input does not authorize the request to access the online banking portal, then at step 1140, the computing platform may prevent the user computing device from accessing the online banking portal. Alternatively, if the computing platform determines that the token response input does authorize the request to access the online banking portal, then at step 1145, the computing platform may provide the user computing device with access to the online banking portal.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method, comprising:
receiving, by a computing platform, a request to register a mobile device as a push notification recipient;
based on receiving the request to register the mobile device as the push notification recipient, storing, by the computing platform, device information for the mobile device to register the mobile device as a registered mobile device linked to a user account;
generating, by the computing platform, a certificate for the registered mobile device based on the device information stored for the mobile device and a private key maintained by the registered mobile device;
sending, by the computing platform, to the registered mobile device, the certificate generated by computing platform for the registered mobile device;
receiving, by the computing platform, and from a user computing device, a request to access an online banking portal using the user account, wherein the online banking portal comprises a customer-facing online banking website that is provided by a financial institution operating the computing platform, the customer-facing online banking website comprising a plurality of interactive user interfaces configured to allow one or more users of the customer-facing online banking website to access financial account information maintained by the financial institution operating the computing platform, transfer funds between financial accounts maintained by the financial institution operating the computing platform, and request and perform transactions using financial accounts maintained by the financial institution operating the computing platform;
based on receiving the request to access the online banking portal, generating, by the computing platform, a notification for the registered mobile device linked to the user account;
sending, by the computing platform, the notification to the registered mobile device;
after sending the notification to the registered mobile device, receiving, by the computing platform, from the registered mobile device, a message indicating that a user of the registered mobile device has been authenticated by a mobile banking application on the registered mobile device, wherein the mobile banking application on the registered mobile device authenticates the user of the registered mobile device based on biometric input received from the user of the registered mobile device;
generating, by the computing platform, a one-time token message that includes a prompt for authorizing the user computing device to access the online banking portal using the user account;
encrypting, by the computing platform, the one-time token message based on the certificate generated by computing platform for the registered mobile device;

sending, by the computing platform, the one-time token message to the registered mobile device;

receiving, by the computing platform, token response input from the registered mobile device;

if the token response input does not authorize the user computing device to access the online banking portal using the user account, preventing, by the computing platform, the user computing device from accessing the online banking portal using the user account;

if the token response input does authorize the user computing device to access the online banking portal using the user account, providing, by the computing platform, the user computing device with access to the online banking portal using the user account;

receiving, by the computing platform, via the online banking portal, and from the user computing device, a request to perform a transaction involving at least one financial account linked to the user account, the request to perform the transaction involving the at least one financial account linked to the user account being created on the online banking portal via at least one user interface of the customer-facing online banking web site that is provided by the financial institution operating the computing platform, wherein the request to perform the transaction involving the at least one financial account linked to the user account comprises a request to register a new device as a push notification recipient with the financial institution operating the computing platform;

based on receiving the request to perform the transaction, generating, by the computing platform, a second notification for the registered mobile device linked to the user account;

sending, by the computing platform, the second notification to the registered mobile device;

after sending the second notification to the registered mobile device, generating, by the computing platform, a second one-time token message that includes a prompt for authorizing the transaction;

encrypting, by the computing platform, the second one-time token message based on the certificate generated by computing platform for the registered mobile device;

sending, by the computing platform, the second one-time token message to the registered mobile device;

receiving, by the computing platform, second token response input from the registered mobile device;

if the second token response input does not authorize the transaction, canceling, by the computing platform, the request to perform the transaction; and if the second token response input does authorize the transaction, causing, by the computing platform, the transaction to be performed, wherein the mobile banking application on the registered mobile device is configured to present the prompt included in the one-time token message to the user of the registered mobile device, the mobile banking application being associated with the financial institution operating the computing platform, wherein the mobile banking application on the registered mobile device is configured to present the prompt included in the second one-time token message to the user of the registered mobile device, and wherein the second notification deep links to a user interface of the mobile banking application that includes a list of pending one-time token requests.

2. The method of claim 1, wherein the notification is sent to the registered mobile device using a push notification service associated with an operating system of the registered mobile device.

3. The method of claim 1, wherein the registered mobile device decrypts the one-time token message based on the certificate to present the prompt for authorizing the user computing device to access the online banking portal using the user account.

4. The method of claim 1, wherein the registered mobile device decrypts the second one-time token message based on the certificate to present the prompt for authorizing the transaction.

5. The method of claim 1, wherein the mobile banking application provides a soft login functionality that causes the mobile banking application to present a user interface that includes the list of pending one-time token requests without requiring user authentication.

6. The method of claim 1, wherein the second one-time token has a time-to-live parameter that causes the second one-time token to expire after a predetermined amount of time elapses.

7. The method of claim 1, wherein the computing platform is configured to generate an additional one-time token for authorizing a request to register a new device as a push notification recipient.

8. The method of claim 1, wherein the computing platform is configured to generate an additional one-time token for authorizing a request to transfer an amount of funds that exceeds a predetermined threshold amount.

9. The method of claim 1, wherein the request to perform the transaction involving the at least one financial account linked to the user account further comprises one or more of: a request to execute a particular transaction involving one or more financial accounts maintained by the financial institution operating the computing platform, a request to pay one or more bills via an online bill pay interface provided by the financial institution operating the computing platform, a request to transfer funds to another account using at least one financial account maintained by the financial institution operating the computing platform, a request to execute a brokerage transaction using at least one financial account maintained by the financial institution operating the computing platform, or a request to perform a transaction involving a home equity line of credit using at least one financial account maintained by the financial institution operating the computing platform.

10. The method of claim 1,
wherein the one-time token message has a first time-to-live parameter that causes the one-time token to expire after a first predetermined amount of time elapses,
wherein the second one-time token has a second time-to-live parameter that causes the second one-time token to expire after a second predetermined amount of time elapses, and
wherein the first time-to-live parameter that causes the one-time token to expire after the first predetermined amount of time elapses is different from the second time-to-live parameter that causes the second one-time token to expire after the second predetermined amount of time elapses.

11. The method of claim 10, wherein the second time-to-live parameter that causes the second one-time token to expire after the second predetermined amount of time elapses is selected based on a type of request corresponding to the second one-time token.

12. The method of claim 10, comprising:
canceling, by the computing platform, the request to perform the transaction based on the second one-time token expiring.

13. The method of claim 1, comprising:
after registering the new device as a push notification recipient with the financial institution operating the computing platform:
  sending, by the computing platform, to the registered mobile device, one or more one-time token messages corresponding to one or more tokenized requests associated with the user account; and
  sending, by the computing platform, to the new device, the one or more one-time token messages corresponding to the one or more tokenized requests associated with the user account.

14. A computing platform, comprising:
at least one processor; and
memory storing computer-readable instructions that, when executed by the at least one processor, cause the computing platform to:
  receive a request to register a mobile device as a push notification recipient;
  based on receiving the request to register the mobile device as the push notification recipient, store device information for the mobile device to register the mobile device as a registered mobile device linked to a user account;
  generate a certificate for the registered mobile device based on the device information stored for the mobile device and a private key maintained by the registered mobile device;
  send, to the registered mobile device, the certificate generated by computing platform for the registered mobile device;
  receive, from a user computing device, a request to access an online banking portal using the user account, wherein the online banking portal comprises a customer-facing online banking website that is provided by a financial institution operating the computing platform, the customer-facing online banking website comprising a plurality of interactive user interfaces configured to allow one or more users of the customer-facing online banking website to access financial account information maintained by the financial institution operating the computing platform, transfer funds between financial accounts maintained by the financial institution operating the computing platform, and request and perform transactions using financial accounts maintained by the financial institution operating the computing platform;
  based on receiving the request to access the online banking portal, generate a notification for the registered mobile device linked to the user account;
  send the notification to the registered mobile device;
  after sending the notification to the registered mobile device, receive, from the registered mobile device, a message indicating that a user of the registered mobile device has been authenticated by a mobile banking application on the registered mobile device, wherein the mobile banking application on the registered mobile device authenticates the user of the registered mobile device based on biometric input received from the user of the registered mobile device;
  generate a one-time token message that includes a prompt for authorizing the user computing device to access the online banking portal using the user account;
  encrypt the one-time token message based on the certificate generated by computing platform for the registered mobile device;
  send the one-time token message to the registered mobile device;
  receive token response input from the registered mobile device;
  if the token response input does not authorize the user computing device to access the online banking portal using the user account, prevent the user computing device from accessing the online banking portal using the user account;
  if the token response input does authorize the user computing device to access the online banking portal using the user account, provide the user computing device with access to the online banking portal using the user account;
  receive, via the online banking portal, and from the user computing device, a request to perform a transaction involving at least one financial account linked to the user account, the request to perform the transaction involving the at least one financial account linked to the user account being created on the online banking portal via at least one user interface of the customer-facing online banking web site that is provided by the financial institution operating the computing platform, wherein the request to perform the transaction involving the at least one financial account linked to the user account comprises a request to register a new device as a push notification recipient with the financial institution operating the computing platform;
  based on receiving the request to perform the transaction, generate a second notification for the registered mobile device linked to the user account;
  send the second notification to the registered mobile device;
  after sending the second notification to the registered mobile device, generate a second one-time token message that includes a prompt for authorizing the transaction;
  encrypt the second one-time token message based on the certificate generated by computing platform for the registered mobile device;
  send the second one-time token message to the registered mobile device;
  receive second token response input from the registered mobile device;
  if the second token response input does not authorize the transaction, cancel the request to perform the transaction; and
  if the second token response input does authorize the transaction, cause the transaction to be performed,
  wherein the mobile banking application on the registered mobile device is configured to present the prompt included in the one-time token message to the user of the registered mobile device, the mobile banking application being associated with the financial institution operating the computing platform,
  wherein the mobile banking application on the registered mobile device is configured to present the prompt included in the second one-time token message to the user of the registered mobile device, and wherein the second notification deep links to a user interface of the mobile banking application that includes a list of pending one-time token requests.

15. One or more non-transitory computer-readable media storing instructions that, when executed by a computing platform comprising at least one processor and memory, cause the computing platform to:
receive a request to register a mobile device as a push notification recipient;
based on receiving the request to register the mobile device as the push notification recipient, store device information for the mobile device to register the mobile device as a registered mobile device linked to a user account;
generate a certificate for the registered mobile device based on the device information stored for the mobile device and a private key maintained by the registered mobile device;
send, to the registered mobile device, the certificate generated by computing platform for the registered mobile device;
receive, from a user computing device, a request to access an online banking portal using the user account, wherein the online banking portal comprises a customer-facing online banking website that is provided by a financial institution operating the computing platform, the customer-facing online banking website comprising a plurality of interactive user interfaces configured to allow one or more users of the customer-facing online banking website to access financial account information maintained by the financial institution operating the computing platform, transfer funds between financial accounts maintained by the financial institution operating the computing platform, and request and perform transactions using financial accounts maintained by the financial institution operating the computing platform;
based on receiving the request to access the online banking portal, generate a notification for the registered mobile device linked to the user account;
send the notification to the registered mobile device;
after sending the notification to the registered mobile device, receive, from the registered mobile device, a message indicating that a user of the registered mobile device has been authenticated by a mobile banking application on the registered mobile device, wherein the mobile banking application on the registered mobile device authenticates the user of the registered mobile device based on biometric input received from the user of the registered mobile device;
generate a one-time token message that includes a prompt for authorizing the user computing device to access the online banking portal using the user account;
encrypt the one-time token message based on the certificate generated by computing platform for the registered mobile device;
send the one-time token message to the registered mobile device;
receive token response input from the registered mobile device;
if the token response input does not authorize the user computing device to access the online banking portal using the user account, prevent the user computing device from accessing the online banking portal using the user account;
if the token response input does authorize the user computing device to access the online banking portal using the user account, provide the user computing device with access to the online banking portal using the user account;
receive, via the online banking portal, and from the user computing device, a request to perform a transaction involving at least one financial account linked to the user account, the request to perform the transaction involving the at least one financial account linked to the user account being created on the online banking portal via at least one user interface of the customer-facing online banking website that is provided by the financial institution operating the computing platform, wherein the request to perform the transaction involving the at least one financial account linked to the user account comprises a request to register a new device as a push notification recipient with the financial institution operating the computing platform;
based on receiving the request to perform the transaction, generate a second notification for the registered mobile device linked to the user account;
send the second notification to the registered mobile device;
after sending the second notification to the registered mobile device, generate a second one-time token message that includes a prompt for authorizing the transaction;
encrypt the second one-time token message based on the certificate generated by computing platform for the registered mobile device;
send the second one-time token message to the registered mobile device;
receive second token response input from the registered mobile device;
if the second token response input does not authorize the transaction, cancel the request to perform the transaction; and
if the second token response input does authorize the transaction, cause the transaction to be performed,
wherein the mobile banking application on the registered mobile device is configured to present the prompt included in the one-time token message to the user of the registered mobile device, the mobile banking application being associated with the financial institution operating the computing platform,
wherein the mobile banking application on the registered mobile device is configured to present the prompt included in the second one-time token message to the user of the registered mobile device, and
wherein the second notification deep links to a user interface of the mobile banking application that includes a list of pending one-time token requests.

* * * * *